(12) United States Patent
Marshall et al.

(10) Patent No.: US 11,241,931 B2
(45) Date of Patent: Feb. 8, 2022

(54) HEATING, VENTILATION, AND AIR CONDITIONING (HVAC) ASSEMBLY FOR SUPPLYING DIFFERENT MIXED AIR FLOWS SIMULTANEOUSLY AND METHOD FOR MANAGING THE SAME

(71) Applicant: Valeo North America, Inc., Auburn Hills, MI (US)

(72) Inventors: Steven Marshall, Auburn Hills, MI (US); Darshan Parikh, Auburn Hills, MI (US); Steven Hruska, Auburn Hills, MI (US); Sally Dagher, Auburn Hills, MI (US); Richard Sikorski, Auburn Hills, MI (US)

(73) Assignee: Valeo North America, Inc., Auburn Hills, MI (US)

( * ) Notice: Subject to any disclaimer, the term of this patent is extended or adjusted under 35 U.S.C. 154(b) by 112 days.

(21) Appl. No.: 16/721,011

(22) Filed: Dec. 19, 2019

(65) Prior Publication Data
US 2021/0188035 A1    Jun. 24, 2021

(51) Int. Cl.
    *B60H 1/00*    (2006.01)
(52) U.S. Cl.
    CPC ..... *B60H 1/00035* (2013.01); *B60H 1/00007* (2013.01); *B60H 1/00428* (2013.01);
    (Continued)
(58) Field of Classification Search
    CPC ............. B60H 1/0035; B60H 1/00007; B60H 1/00428; B60H 1/00664; B60H 1/00735;
    (Continued)

(56) References Cited

U.S. PATENT DOCUMENTS 4,012,020 A * 3/1977 Dixon ................ B60H 1/00521
                                                    248/651
7,013,967 B2   3/2006 Kondo
                (Continued)

FOREIGN PATENT DOCUMENTS

DE    10 2019 106778 A1    9/2019
EP         1466764 A1     10/2004
                (Continued)

OTHER PUBLICATIONS

Notification of Transmittal of the International Search Report and the Written Opinion in corresponding International Application No. PCT/US2020/066052, dated Apr. 15, 2021 (15 pages).

*Primary Examiner* — Marc E Norman
(74) *Attorney, Agent, or Firm* — Osha Bergman Watanabe & Burton LLP

(57) ABSTRACT

A heating, ventilation, and air-conditioning (HVAC) assembly for supplying different mixed air flows simultaneously is disclosed. The assembly includes first blend kinematics configured for allowing passage of a first air flow, second blend kinematics configured for allowing passage of a second air flow, obtaining means configured to obtain a temperature command indicating a target temperature for two different locations outside the HVAC assembly, identifying means configured to identify a pattern for the first blend kinematics and the second blend kinematics for modifying the first air flow and the second air flow based on the temperature command, and coordinating means configured to coordinate each of the first blend kinematics and the second blend kinematics simultaneously.

20 Claims, 13 Drawing Sheets

(52) U.S. Cl.
CPC ..... *B60H 1/00664* (2013.01); *B60H 1/00735* (2013.01); *B60H 2001/003* (2013.01); *B60H 2001/0015* (2013.01); *B60H 2001/00085* (2013.01); *B60H 2001/00092* (2013.01); *B60H 2001/00185* (2013.01); *B60H 2001/00721* (2013.01)

(58) Field of Classification Search
CPC .......... B60H 2001/00085; B60H 2001/00092; B60H 2001/00185; B60H 2001/003; B60H 2001/00721
See application file for complete search history.

(56) References Cited

U.S. PATENT DOCUMENTS

| | | | |
|---|---|---|---|
| 2002/0139862 A1* | 10/2002 | Tsunoda ............... | B60H 1/0075 236/91 C |
| 2008/0034764 A1* | 2/2008 | Iwasaki .............. | B60H 1/00735 62/159 |
| 2015/0336439 A1* | 11/2015 | Wang ................. | B60H 1/00064 165/203 |
| 2016/0303941 A1* | 10/2016 | Kinmartin .......... | B60H 1/00021 |
| 2018/0370322 A1* | 12/2018 | Filipkowski ......... | B60H 1/0055 |
| 2019/0291532 A1 | 9/2019 | Kim et al. | |

FOREIGN PATENT DOCUMENTS

| | | |
|---|---|---|
| JP | H08-175151 A | 7/1996 |
| JP | 2013052750 A | 3/2013 |
| JP | 2019209780 A | 12/2019 |
| KR | 102001998 B1 | 7/2019 |
| WO | 2013-152949 A1 | 10/2013 |

\* cited by examiner

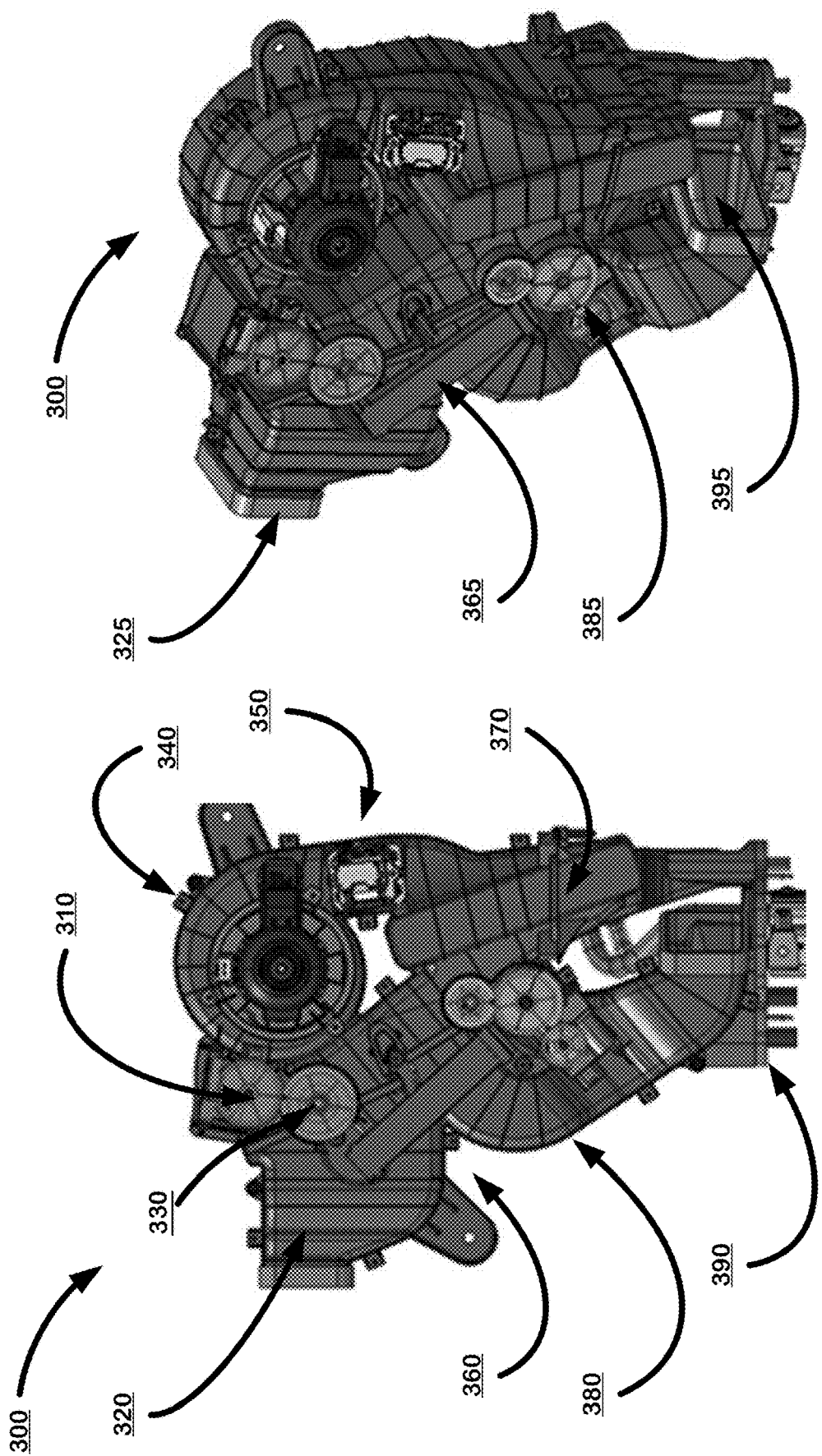

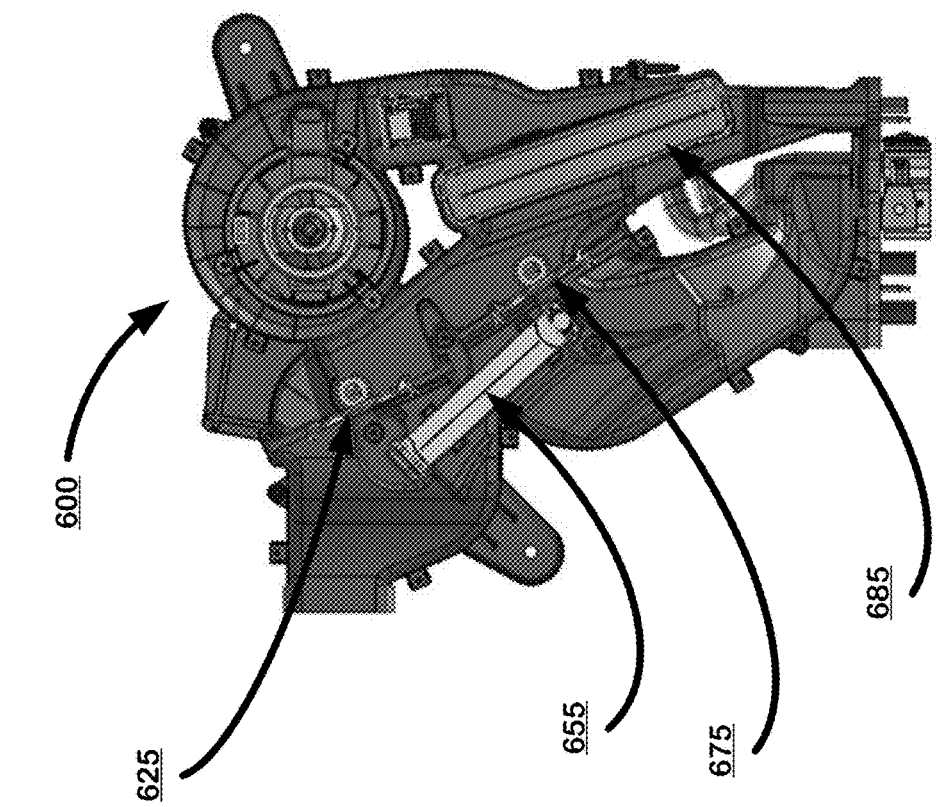
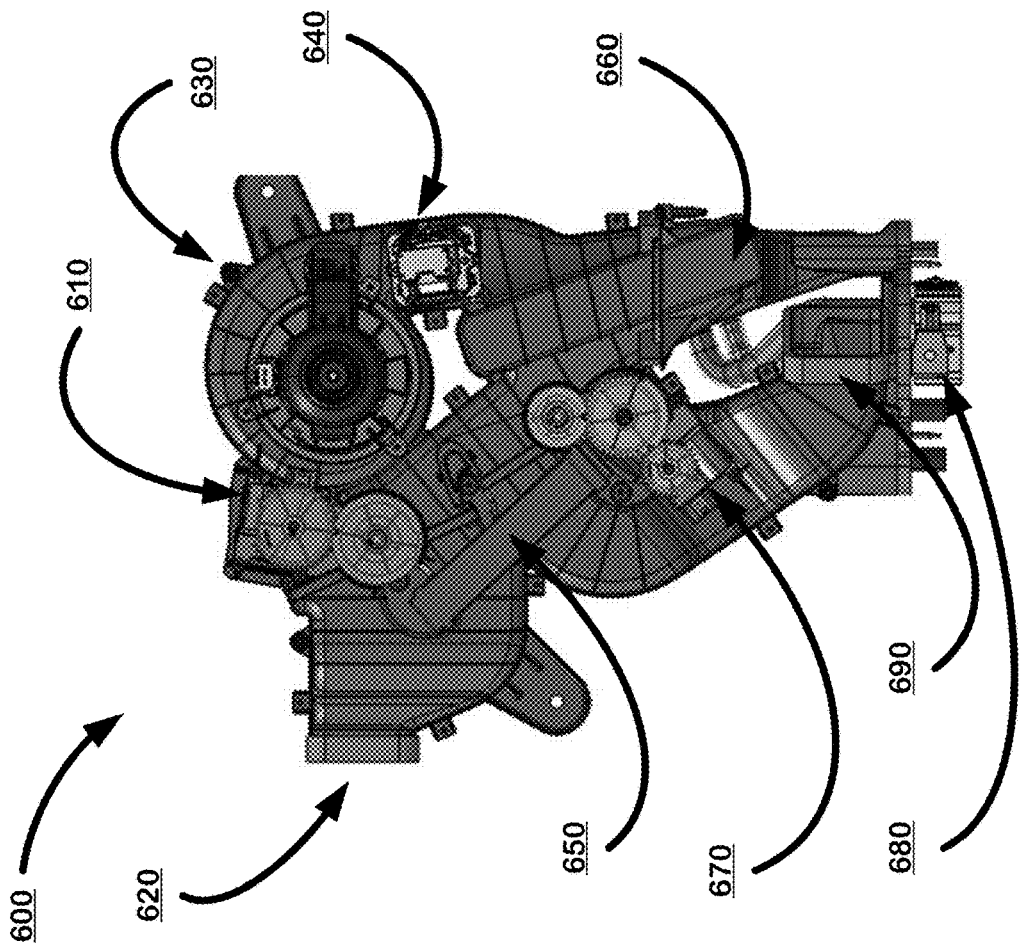

1200

Obtaining a temperature command based on a rule indicating a target temperature of two locations outside the HVAC assembly, a current temperature of the two locations, an outside temperature, and/or a function representative of the target temperature of a passenger cabin, the current temperature of the passenger cabin, and the outside temperature
1210

Identifying a pattern for each blend kinematics to mix two flows based on the temperature command, he temperature command including at least one value representative of the rule that determines a location for supplying air flows from each of the blend kinematics
1220

Coordinating the first blend kinematics and the second blend kinematics simultaneously, each blend kinematics regulating a corresponding hot air flow and a corresponding cold air flow
1230

Mixing the corresponding hot air flows and the corresponding cold air flows and dynamically modifying each blend kinematics based on immediate changes to the temperature command and the rule
1240

*FIG. 12*

HEATING, VENTILATION, AND AIR CONDITIONING (HVAC) ASSEMBLY FOR SUPPLYING DIFFERENT MIXED AIR FLOWS SIMULTANEOUSLY AND METHOD FOR MANAGING THE SAME

BACKGROUND

In the automotive field, heating, ventilation, and/or air conditioning (HVAC) systems regulate the aerothermal parameters of the air circulated inside a motor vehicle. Air inlets are devices performing the functionality of allowing air flows from one area to another. The air inlets are doors that open and/or close following a user's command. As such, the air inlets allow air flow to travel from one chamber to another in an HVAC assembly when an air inlet.

SUMMARY

In general, in one aspect, embodiments disclosed herein relate to a heating, ventilation, and air-conditioning (HVAC) assembly for supplying different mixed air flows simultaneously. The assembly includes first blend kinematics configured for allowing passage of a first air flow, second blend kinematics configured for allowing passage of a second air flow, obtaining means configured to obtain a temperature command indicating a target temperature for two different locations outside the HVAC assembly, identifying means configured to identify a pattern for the first blend kinematics and the second blend kinematics for modifying the first air flow and the second air flow based on the temperature command, and coordinating means configured to coordinate each of the first blend kinematics and the second blend kinematics simultaneously. The identifying means and the coordinating means dynamically modify each of the first and second blend kinematics individually based on immediate changes to the temperature command. The air flows can each regulate a corresponding hot air flow and a corresponding cold air flow.

In general, in one aspect, embodiments disclosed herein relate to a method for supplying different mixed air flows simultaneously in a heating, ventilation, and air-conditioning (HVAC) assembly. The method includes obtaining a temperature command indicating a target temperature for two different locations outside the HVAC assembly, identifying a pattern for first blend kinematics and second blend kinematics for modifying a first air flow and a second air flow based on the temperature command, coordinating each of the first blend kinematics and the second blend kinematics simultaneously, and dynamically modifying each of the blend kinematics individually based on immediate changes to the temperature command. The air flows can each regulate a corresponding hot air flow and a corresponding cold air flow.

In general, in one aspect, embodiments disclosed herein relate to a heating, ventilation, and air-conditioning (HVAC) assembly for supplying different mixed air flows simultaneously. The assembly includes first blend kinematics configured for allowing passage of a first air flow, second blend kinematics configured for allowing passage of a second air flow, obtaining means configured to obtain a temperature command indicating a target temperature for two different locations outside the HVAC assembly, identifying means configured to identify a pattern for the first blend kinematics and the second blend kinematics for modifying the first air flow and the second air flow based on the temperature command, and coordinating means configured to coordinate each of the first blend kinematics and the second blend kinematics simultaneously, and a support assembly and fastening flaps configured for allowing connection of the HVAC assembly into a packaging space. The identifying means and the coordinating means dynamically modify each of the first and second blend kinematics individually based on immediate changes to the temperature command. The air flows can each regulate a corresponding hot air flow and a corresponding cold air flow.

Other aspects of the disclosure will be apparent from the following description and the appended claims.

BRIEF DESCRIPTION OF DRAWINGS

FIGS. 3A and 3B show an HVAC assembly in accordance with one or more embodiments.

FIGS. 6A and 6B show an HVAC assembly in accordance with one or more embodiments.

FIG. 12 shows a flowchart describing a process for supplying different mixed air flows to corresponding locations inside a motor vehicle in accordance with one or more embodiments.

DETAILED DESCRIPTION

Figure 1:
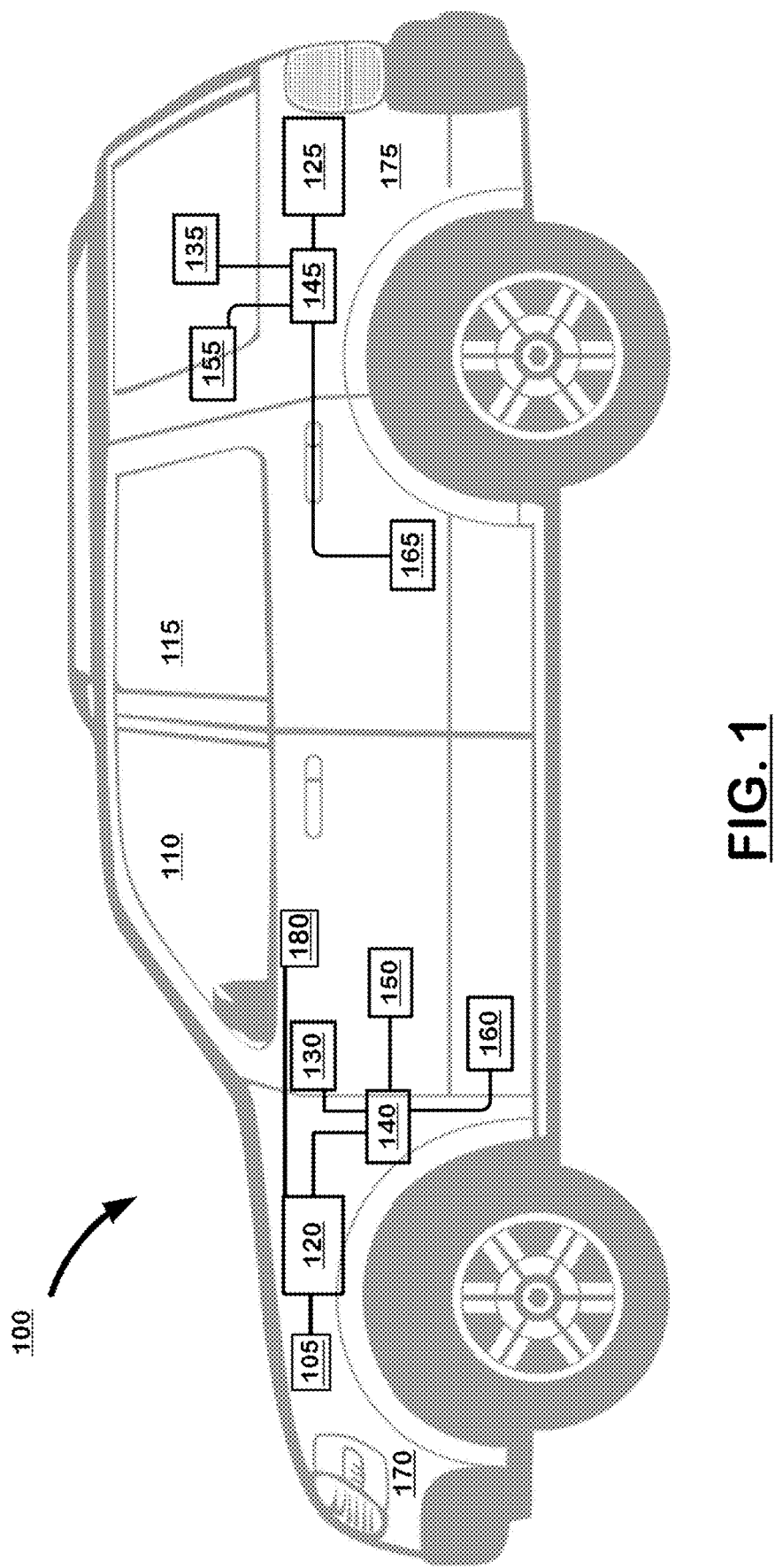
FIG. 1 shows a block diagram of an automotive system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include methods, assemblies, and systems directed to supplying different mixed air flows simultaneously from an HVAC assembly by implementing an HVAC architecture including individual controls for each mixed air flow. In one or more embodiments, an HVAC assembly may be configured for operating in a partial mixing mode allowing passage of hot air flow before allowing passage of cold air flow. Similarly, in one or more embodiments, the HVAC assembly may be configured for operating in the partial mixing mode allowing passage of the cold air flow before allowing passage of the hot air flow. The HVAC system configuration may be useful in cold weather by circulating air in response to a temperature command requesting warming up, or in hot weather by circulating air in response to the temperature command requesting cooling down, or based on the parameters indicating immediate changes of the speed and the temperature surrounding the motor vehicle. As such, simultaneous coordination of different temperatures from a same HVAC assembly may prevent an unwanted rush of the hot air flow or the cold air flow blasting into the HVAC assembly and air leakage. Thus, maintaining a constant temperature in a passenger cabin may be achieved by coordinating blend kinematics in the HVAC assembly. Further, the temperature command may include control information for two different locations outside the HVAC assembly. As such, blend kinematics may be coordinated for implementing preferred air pressures and temperature levels at different locations at a same time. Multiple blend kinematics may be implemented to supply dual air flows outside an HVAC assembly.

FIG. 1 shows a block diagram of motor vehicle system in accordance with one or more embodiments. Specifically, FIG. 1 shows a heating, ventilation, and air-conditioning (HVAC) system (100) for a motor vehicle according to one or more embodiments, having various equipment that is powered during regular operation of the motor vehicle. The HVAC system (100) may be a split HVAC system configured to connect two HVAC subassemblies for the HVAC system (100) to operate. The HVAC system (100) may be a single system installed at the front or at the back of a motor vehicle. Additionally, the HVAC system (100) may be one system divided between two parts, one located at the front and another one located at the back of the motor vehicle. In one or more embodiments, a system, or sub-system, located at the front of the vehicle may include the same elements mirrored in the back of the vehicle. In one or more embodiments, the motor vehicle may be divided into two areas: an area outside passenger compartments (170, 175) and an area inside passenger compartments (110, 115). Furthermore, the system may include a distribution controller (120, 125), an airflow space (130, 135), a blower motor (140, 145), an evaporator (150, 155), and a heater core (160, 165). Those skilled in the art will appreciate that the configuration of FIG. 1 is not limited to that which is shown, and that one or more of the above-mentioned components may be combined or omitted.

The area outside passenger compartments (170, 175) may be any area that a passenger does not have access to through regular use of the motor vehicle. As such, these areas may include under and above the motor vehicle, under the hood at the front of the motor vehicle, or in the trunk at the back of the motor vehicle. This area may be larger in larger vehicles or vehicles that do not require a conventional engine, such as is the case with electric motor vehicles. In a hatchback vehicle, or a vehicle with the back or front exposed to the driver, this area may be considered as any area beyond the dashboard at the front or any area behind the back seats at the back. Similarly, the area outside the passenger compartment may include an area in between the walls of the motor vehicle or inside a pre-packaged compartment including the HVAC system (100).

The area inside passenger compartments (110, 115) may be any area that any passenger has access to at any point through regular use of the motor vehicle. For example, this area may include any area from the dashboard towards the direction of the driver and any area from the back seats towards the front of the car. The area inside passenger compartments (110, 115) may include an area near a driver's seat and two or more rows of passenger seats behind the driver's seat.

The system may include a blower motor (140, 145) hardware configured to produce regulated burst of rotational force to activate subsequent motors or directly impact flow of air in the airflow chamber and the airflow space (130, 135). For example, the blower motor (140, 145) may be considered a device for enabling a fan to push hot/cold air in/out of the area inside passenger compartments (110, 115).

The air flow space (130, 135) may be hardware configured for transporting airflow inside/outside the motor vehicle. In the HVAC system (100), these components may circulate air in/out of the motor vehicle while avoiding impacting shifting in weights. For example, the air flow space (130, 135) may be coupled to the evaporator (150, 155) and the heater core (160, 165) for moving an air flow through the motor vehicle. Similarly, the HVAC system (100) may include two or more outlets regulated individually for air flows of different pressures to flow outside the HVAC system. To this point, in motor vehicles in which several rows of passenger seats are available, the HVAC system may control air flows for circulating different air pressures at different rows simultaneously.

The evaporator (150, 155) and the heater core (160, 165) may be one or more elements of an electric radiator that exchanges heat with at least one fluid to change a temperature level in the distributed airflow.

The distribution controller (120, 125) may be a processor or a human-machine interface though which the blower motor (140, 145) is controlled. The distribution controller (120, 125) may be a processor coupled with motors connected to air inlets for distributing airflow in/out the motor vehicle. Further, the distribution controller (120, 125) may control and regulate the use of the evaporator (150, 155) and the heater core (160, 165). For example, the air inlets may be fresh air inlets and recycled air inlets configured to combine mixed air for maintenance of a pressure or a temperature inside a passenger cabin of a motor vehicle. The distribution controller (120, 125) may be coupled to one or more electronic components configured to dynamically modify the aperture of the various air inlets at two or more different locations outside the HVAC system. These means may be electronic components configured for synthesizing and actuating motors coupled to one or more flaps for dynamically modifying an aperture on one or more of the air flaps. In one or more embodiments, these means are subassemblies including sensors connected to the distribution controller (120, 125) that sends out data, or commands to an actuator of a specific air flap. As such, the means may be an Engine Control Unit (ECU) (105) of a motor vehicle. The air inlets and their respective combinations are described in more detail in FIGS. 3-14 below.

In one or more embodiments, the HVAC system (100) may be a standalone system configured to supply individual air flows at different temperatures simultaneously. Specifically, the HVAC system (100) may be disconnected from the rest of the ECU (105) to allow users near the standalone system to control the corresponding air flow directly. In one or more embodiments, the standalone system is configured to communicate with the ECU (105) and a user near the air flow may be allowed to control the standalone system and overwriting a current configuration established by the ECU (105).

The HVAC system (100) may be assembled in at least two distinct subassemblies. As such, the above-referenced elements of the HVAC system (100) may be distributed in one or both of the subassemblies. For example, in one or more embodiments, the evaporator (150, 155) and the blower motor (140, 145) may be part of a first subassembly of the HVAC system (100), located outside of the passenger compartment of the motor vehicle, while the heater core (160, 165) and the distribution controller (120, 125) may be part of a second subassembly of the HVAC system, located inside the passenger compartment of the motor vehicle. Those skilled in the art will appreciate that embodiments disclosed herein are not limited to the aforementioned example of distribution of elements across subassemblies and that these elements may be located in either subassembly without departing from embodiments disclosed herein.

The area outside of the passenger compartment and the area inside the passenger compartment may be split by a wall (not shown). The wall may be, in one or more embodiments, a metal sheet associated with the dashboard (not shown in FIG. 1) of the motor vehicle.

Figure 2:
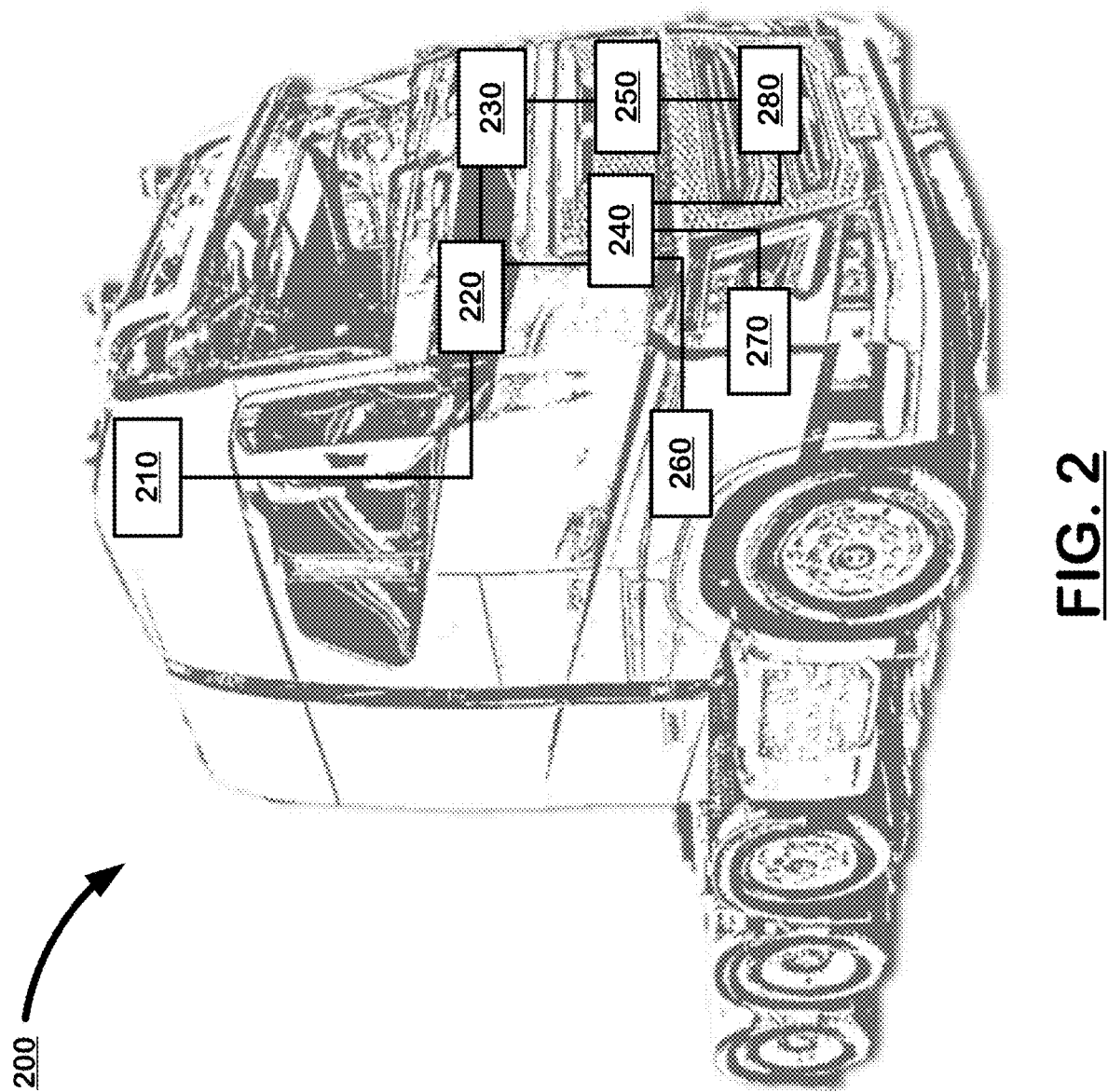
FIG. 2 shows a block diagram of an automotive system in accordance with one or more embodiments.

Turning to FIG. 2, FIG. 2 shows a block diagram of an automotive system in accordance with one or more embodiments. FIG. 2 shows an extended HVAC system (200) for a heavy motor vehicle such as a truck according to one or more embodiments having various equipment that is powered during regular operation of the heavy motor vehicle. The extended HVAC system (200) may be one system divided between two parts, one located at the front and another one located at the back of the heavy motor vehicle, or one located at the top and another one located at the bottom of the heavy motor vehicle. In one or more embodiments, a system, or sub-system, located at the front of the vehicle may include the same elements mirrored in the back of the heavy motor vehicle. In one or more embodiments, the heavy motor vehicle is a truck and may include one or more sensing elements (210, 230, 250), a distribution controller (220), a blower motor (240), an evaporator (260), a heater core (270), and an airflow space (280).

The system may include one or more sensing elements (210, 230, 250), which may be hardware configured to evaluate surrounding areas inside/outside the heavy motor vehicle and provide feedback relating to physical phenomena. In one or more embodiments, the one or more sensing elements (210, 230, 250) may be a first sensing element (210), a second sensing element (230), and a third sensing element (250). The one or more sensing elements (210, 230, 250) may operate individually or in cooperation with one another to provide a distribution controller (220) with information relating to the physical phenomena. The one or more sensing elements (210, 230, 250) may be hardware sensors for sensing/measuring the vehicle environment, such as object detection sensors, temperature sensors, distance sensors, etc. For example, the one or more sensing elements (210, 230, 250) may aid in a self-driving operation of the heavy motor vehicle. In one or more embodiments, the one or more sensing elements (210, 230, 250) may provide a driver with visual/audio signals relating to the surrounding areas of the heavy motor vehicle. Furthermore, the one or more sensing elements (210, 230, 250) may be part of an autonomous operating system that determines various temperature values for the inside of the cabin in the heavy motor vehicle.

The distribution controller (220) may be a processor or a human-machine interface though which the blower motor (240) and the one or more sensing elements (210, 230, 250) are controlled. The distribution controller (220) may be a processor coupled with motors connected to air inlets for distributing airflow in the heavy motor vehicle. Further, the distribution controller (220) may control and regulate the use of the evaporator (260) and the heater core (270).

The blower motor (240) may be hardware configured to produce regulated burst of rotational force to activate subsequent motors or directly impact flow of air in the airflow chamber and the airflow space (280). For example, the blower motor (240) may be considered a device for enabling a fan to push hot/cold air in/out of the area inside a passenger compartment.

The evaporator (260) and the heater core (270) may be one or more elements of an electric radiator that exchanges heat with at least one fluid to change a temperature level in the distributed airflow. In one or more embodiments, the evaporator (260) and the heater core (270) may be assembled during a manufacturing process and the evaporator (260) and the heater core (270) may be afterwards installed within the heavy motor vehicle as part of the extended HVAC system (200). In one or more embodiments, the evaporator (260) and/or the heater core (270) may be serviced through the passenger compartment and without uninstalling any other parts of the extended HVAC system (200).

The airflow space (280) may be hardware configured for transporting airflow inside/outside the heavy motor vehicle through one or more air inlets. In the extended HVAC system (200), this component may circulate air in/out of the motor vehicle while avoiding impacting shifting in weights. For example, the airflow space (280) may be coupled to the evaporator (260) and the heater core (270) for moving an airflow through the motor vehicle. Further, the air inlets may be located both towards an outside and towards an inside of the heavy motor vehicle for providing fresh air and recycled air. The air inlets may be configured for combining different positions based on preset configurations or dynamic adaptive modes. The combinations of air inlets and their respective combinations are described in more detail in FIGS. 3-12 below.

The extended HVAC system (200) may be assembled in at least two distinct subassemblies. As such, the above-referenced elements of the extended HVAC system (200) may be distributed in one or both of the subassemblies. For example, in one or more embodiments, the evaporator (260) and the blower motor (240) may be part of a first subassembly of the extended HVAC system (200), located outside of the passenger compartment of the motor vehicle, while the heater core (270) and the distribution controller (220) may be part of a second subassembly of the HVAC system, located inside the passenger compartment of the motor vehicle. Those skilled in the art will appreciate that embodiments disclosed herein are not limited to the aforementioned example of distribution of elements across subassemblies and that these elements may be located in either subassembly without departing from embodiments disclosed herein.

Turning to FIGS. 3A and 3B, FIGS. 3A and 3B show perspective views of an HVAC assembly in accordance with one or more embodiments. As shown in FIGS. 3A and 3B, the HVAC assembly (300) may be a combination of various subassemblies assembled in a direction of insertion within a motor vehicle.

As shown in FIG. 3A, the HVAC assembly (300) may include upper blend kinematics (310) coupled to an upper air flow passageway (320). The HVAC assembly (300) may include an air flow dividing passageway (360) in which two different air flows are divided upon user's request and controlled by a temperature command. Further, the HVAC assembly (300) may include a wheel blower (340) coupled through a blower air flow passageway and through to a fan motor resistor (350). The upper blend kinematics (310) may be coupled to a middle air flow passageway that leads to an evaporator (370). Similarly, the HVAC assembly (300) may include a lower air flow passageway (380) disposed above a support subassembly (390).

Further, as shown in FIG. 3B, the HVAC assembly (300) may include lower blend kinematics (385) coupled to the lower air flow passageway (380). Further, the HVAC assembly (300) may include outlets (325, 395) for releasing air flows from inside the HVAC assembly (300). These outlets (325, 395) may be an upper air flow outlet (325) and a lower air flow outlet (395). Further, the outlets (325, 395) may include seals or insulating packaging configured for preventing air leakage in connections with the HVAC assembly. The HVAC assembly (300) may include a heater core (365) coupled to the upper blend kinematics (310) and the lower air kinematics (385) for supplying air flow through the heater core (365).

In one or more embodiments, the upper blend kinematics (310) are hardware and/or software configured for controlling output air velocity by increasing or reducing a cross-section area between the upper air flow passageway (320) and the middle air flow passageway. To this point, the upper blend kinematics (310) may include mechanical or electronic sensors and actuators configured to move a door by sliding the door between an upper position and a lower position. Similarly, the upper blend kinematics (310) may include sealed connections between the hardware components and the upper air flow passageway (320) and the middle air flow passageway. For example, the upper blend kinematics (310) may include a door that opens one air passageway connection between the upper air flow passageway (320) and the middle air flow passageway and simultaneously closes another door. For example, the door may be a slot, a mouth, a passage, a hole or any suitable aperture in the casing through which air can flow inside, and outside, the casing. As such, doors may be air flaps corresponding to rotating members that open, or close, a hole in the HVAC. In one or more embodiments, these doors may be one sliding door that closes on one end while it opens on another end. That is, the door allows air flow through as long as the HVAC assembly is ON, or energized, by providing complementary air flow passageway access on either side of each door. As such, opening the door into one passageway complementary closes the door for another passageway. The upper blend kinematics (310) may allow air flow to be passed directly from the middle air flow passageway to the upper air flow passageway (320) on one side. Further, the upper blend kinematics (310) may allow air flow to be passed from the middle air flow passageway to the upper air flow passageway (320) through the heater core (365). Thus, when the upper blend kinematics (310) are open, air flow may go through the upper blend kinematics (310) and towards the upper air flow outlet (325). The upper blend kinematics (310) may move independently from the movements of the lower blend kinematics (385). Alternatively, the upper blend kinematics (310) may move in coordination with the movements of the lower blend kinematics (385). To this point, the upper blend kinematics (310) may be coupled to obtaining means (not shown) that control the movement of the upper blend kinematics (310) with respect to the lower blend kinematics (385).

In one or more embodiments, the lower blend kinematics (385) are hardware and/or software configured for controlling output air velocity by increasing or reducing a cross-section area between the lower air flow passageway (380) and the middle air flow passageway. To this point, the lower blend kinematics (385) may include mechanical or electronic sensors and actuators configured to move a door by sliding the door between an upper position and a lower position. Similarly, the lower blend kinematics (385) may include sealed connections between the hardware components and the lower air flow passageway (380) and the middle air flow passageway. For example, the lower blend kinematics (385) may include a door that opens one air passageway connection between the lower air flow passageway (380) and the middle air flow passageway and simultaneously closes another door. For example, the door may be a slot, a mouth, a passage, a hole or any suitable aperture in the casing through which air can flow inside, and outside, the casing. As such, doors may be air flaps corresponding to rotating members that open, or close, a hole in the HVAC. In one or more embodiments, these doors may be one sliding door that closes on one end while it opens another end. That is, the door allows air flow through as long as the HVAC assembly is ON, or energized. The lower blend kinematics (385) may allow air flow to be passed directly from the middle air flow passageway to the lower air flow passageway (380) on one side. Further, the lower blend kinematics (385) may allow air flow to be passed from the middle air flow passageway to the lower air flow passageway (380) through the heater core (365). Thus, when the lower blend kinematics (385) are open, air flow may go through the lower blend kinematics (385) and towards the lower air flow outlet (395). The lower blend kinematics (385) may move independently from the movements of the lower blend kinematics (385). Alternatively, the lower blend kinematics (385) may move in coordination with the movements of the lower blend kinematics (385). To this point, the lower blend kinematics (385) may be coupled to obtaining means (not shown) that control the movement of the lower blend kinematics (385) with respect to upper blend kinematics (310).

In one or more embodiments, identifying means (180, shown in FIG. 1) may be hardware and software configured to effectively determining the position of one door with respect to another. Further, the identifying means may be one or more sensors configured for determining the position of each of the doors. For example, the identifying means (180) may be an internal link cam or another electromechanically movement tracker coupled to the upper blend kinematics (310) and/or the lower blend kinematics (385). The identifying means (180) are attached to one or more of the various doors. To this end, the identifying means (180) may include connectors for assembling to the HVAC assembly. The identifying means (180) may rotate about an axis of rotation in which the aperture of one or more of the various doors may be selected. In particular, the identifying means (180) may be rotated about the axis of rotation in a clockwise direction or in a counter-clockwise direction. Further, the identifying means (180) may determine a pattern of blend kinematics for mixing two or more air flows and for distributing two individual air flows. The identifying means (180) may perform identifying using precision mechanical or electronic components. As such, the aperture of the upper blend kinematics (310) and/or the lower blend kinematics (385) may be incorporated in a sequence that directly relates to the identified pattern. The pattern may further include opening or closing of the various doors determined to a degree of precision. In one or more embodiments, a degree of aperture may be an angle between 0 degrees to 180 degrees. In particular, given the rotational nature of the blend kinematics, an opening of one end of a door may concurrently provide an equivalent rotation on another end of the door.

The obtaining means (not shown, but located at a cross-section of the HVAC assembly (300) in FIG. 3) may be hardware and software coupled with coordinating means (330) that is configured to adjust dynamically corresponding degrees of aperture to maintain a mixed air pressure in the motor vehicle. In one or more embodiments, the mixed air pressure is a preset air pressure that may be pre-configured for a specific circumstance or the mixed air pressure is an air pressure determined upon immediate analysis of one or more parameters inside a passenger cabin of the motor vehicle or outside the motor vehicle. As such, the mixed air pressure may be a combination of a pressure obtained from the various doors. In addition, the mixed air pressure may be a required mixed air pressure to be obtained in a given time. In this event, the combination of proportional pressures from the various doors may be coordinated by the coordinating means (330) and supervised by the obtaining means. In particular, a deficit or surplus of mixed air pressure from a current mixed air pressure to the required mixed air pressure may be a compensation mixed air pressure generated by combining air flows from one or more of the various doors. To this point, the required mixed air pressure may be attained by heating or cooling the mixed air implementing the electronic actuation of a heater core (365) and an evaporator (370).

In one or more embodiments, the obtaining means are hardware and software configured to obtain a temperature command based on a rule or business logic indicating a target temperature of a passenger cabin, a current temperature of the passenger cabin, an outside temperature, and/or a function representative of the target temperature of the passenger cabin, the current temperature of the passenger cabin, and the outside temperature. As such, the obtaining means and the identifying means (180) may evaluate one or more parameters associated with the temperature command. To this point, the obtaining means may obtain at least one result from the evaluated one or more parameters.

In one or more embodiments, the obtaining means may be coupled to the coordinating means (330) and mixing means (not shown, but located at a cross-section of the HVAC assembly (300) in FIG. 3) configured to mix one or more air flows. The mixing means may be one or more engagement pockets arranged cooperatively with respect to the coordinating means (330). The obtaining means and the identifying means (180) may determine the immediate changes to the temperature command and the rule based on the at least one result of the results obtained. To this point, the obtaining means and the identifying means (180) may update the blend kinematics based on the immediate changes to the temperature command and the rule. Thus, the obtaining means may be an Engine Control Unit (ECU) (105) of the motor vehicle coupled to at least one internal link cam.

In one or more embodiments, the coordinating means (330) are attached to one or more of the various blend kinematics for effectively coordinating the movement of one door with respect to another in the HVAC assembly. Further, the coordinating means (330) may coordinate the blend kinematics between the various doors. To this point, the coordinating means (330) include various links and levers interconnected with the various doors.

In one or more embodiments the parameters may be evaluated to dynamically adjust the rotatable position of the various doors. The various doors being configured for rotating simultaneously and/or independent from one another. As such, the various doors may be rotated at different speeds, in different directions about their respective axis of rotation, and in response, or irrespective of, one or more parameters inside/outside a passenger cabin of the motor vehicle.

In one or more embodiments, the evaporator (370) is a radiator component configured to increase the air temperature and pressure in a mixed air chamber from the middle air flow passageway. In one or more embodiments, the evaporator (370) may be disposed subsequent to the positioning of the fan motor resistor (350) by coupling a wheel blower (340) in an environment sealed with air flow obtained through the fan motor resistor (350) and before the mixed air chamber. As such, there may be a direct path for air to flow from the wheel blower (340) to the evaporator (370) and from the evaporator (370) to the mixed air chamber (not shown, but inside the middle air flow passageway in FIG. 3). As such, air flow supplied by the evaporator (370) may be cooled down into the mixed air chamber.

In one or more embodiments, the heater core (365) may be provided with the air flow dividing passageway (360) to seal the air flow though the heater core (365) and to prevent leakage of air during heat exchange. As such, obtaining means, mixing means, and coordinating means (330) may be used to configure and to use the various blend kinematics to coordinate different air flows through each of the upper blend kinematics (310) and the lower blend kinematics (385).

In one or more embodiments, the support subassembly (390) may be provided on a base of the HVAC assembly (300) to maintain a fixed position inside a motor vehicle. In one or more embodiments, the support subassembly (390) is a direct connection to other HVAC assemblies, cooling piping, heating piping, and electronic connections. For example, the support subassembly (390) may act as a plug for a standalone HVAC assembly to be replaces and integrated into any motor vehicle meeting packaging restraints for supplying air using the upper blend kinematics (310) and the lower blend kinematics (385).

Figures 4A, 4B:
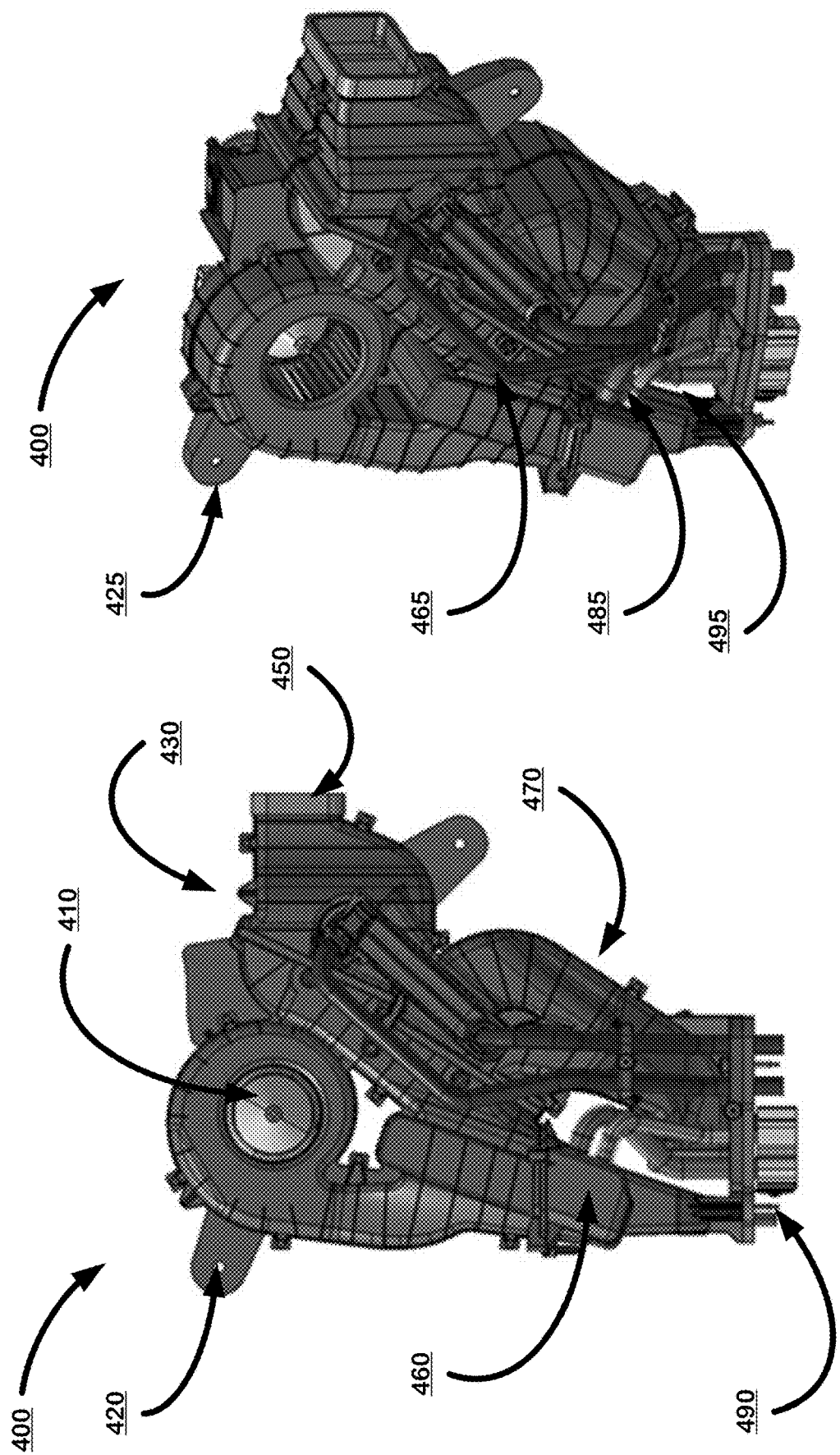
FIGS. 4A and 4B show an HVAC assembly in accordance with one or more embodiments.

Turning to FIGS. 4A and 4B, FIGS. 4A and 4B show perspective views of an HVAC assembly in accordance with one or more embodiments. As shown in FIGS. 4A and 4B, the HVAC assembly (400) may be a combination of various subassemblies assembled in a direction of insertion within a motor vehicle.

As shown in FIG. 4A, the HVAC assembly (400) may include a wheel blower (410) coupled through a blower air flow passageway to an evaporator (460). The HVAC assembly (400) may include upper blend kinematics coupled through an upper air flow passageway (430) to an upper air flow outlet (450). The HVAC assembly (400) may include a support assembly stud (490) disposed on a support subassembly.

Further, as shown in FIG. 4B, the HVAC assembly (400) may include lower blend kinematics coupled through lower air flow passageway (470) to a lower air flow outlet (495).

In one or more embodiments, the HVAC assembly (400) may include heater core piping (465) coupled to a heater core and evaporator piping (485) coupled to an evaporator.

In one or more embodiments, the HVAC assembly (400) is attached to a motor vehicle through fastening means (420, 425) which may include one or more fastening flaps and a support assembly. For example, the support assembly may be introduced on a plug-in orifice and the fastening flaps may be attached through nails, glue, or latching devices to keep the HVAC assemblies (400) in place.

In one or more embodiments, the HVAC subassembly (400) of FIGS. 4A and 4B may be arranged in different locations inside an HVAC assembly. Thus, the various elements described with respect to FIGS. 4A and 4B may perform all the functions described in FIGS. 3A and 3B, but placed at different locations in the HVAC assembly for dynamically moving the doors from a closed position to an open position, or from the open position to the closed position. To this point, the various doors may be moved by a same or different actuators with respect to the others.

Figure 7:
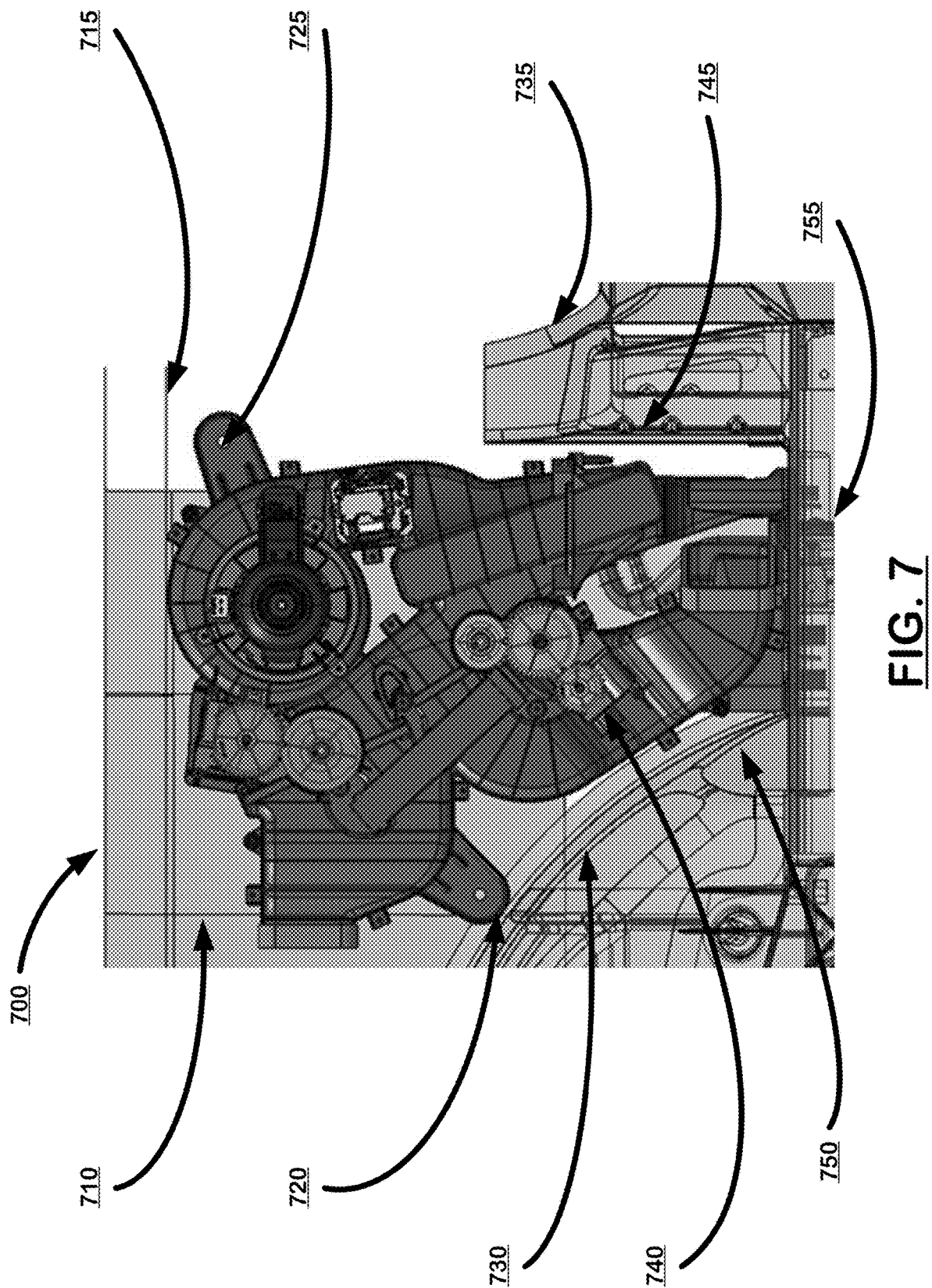
FIG. 7 shows an example of an HVAC assembly in accordance with one or more embodiments.
Figure 8:
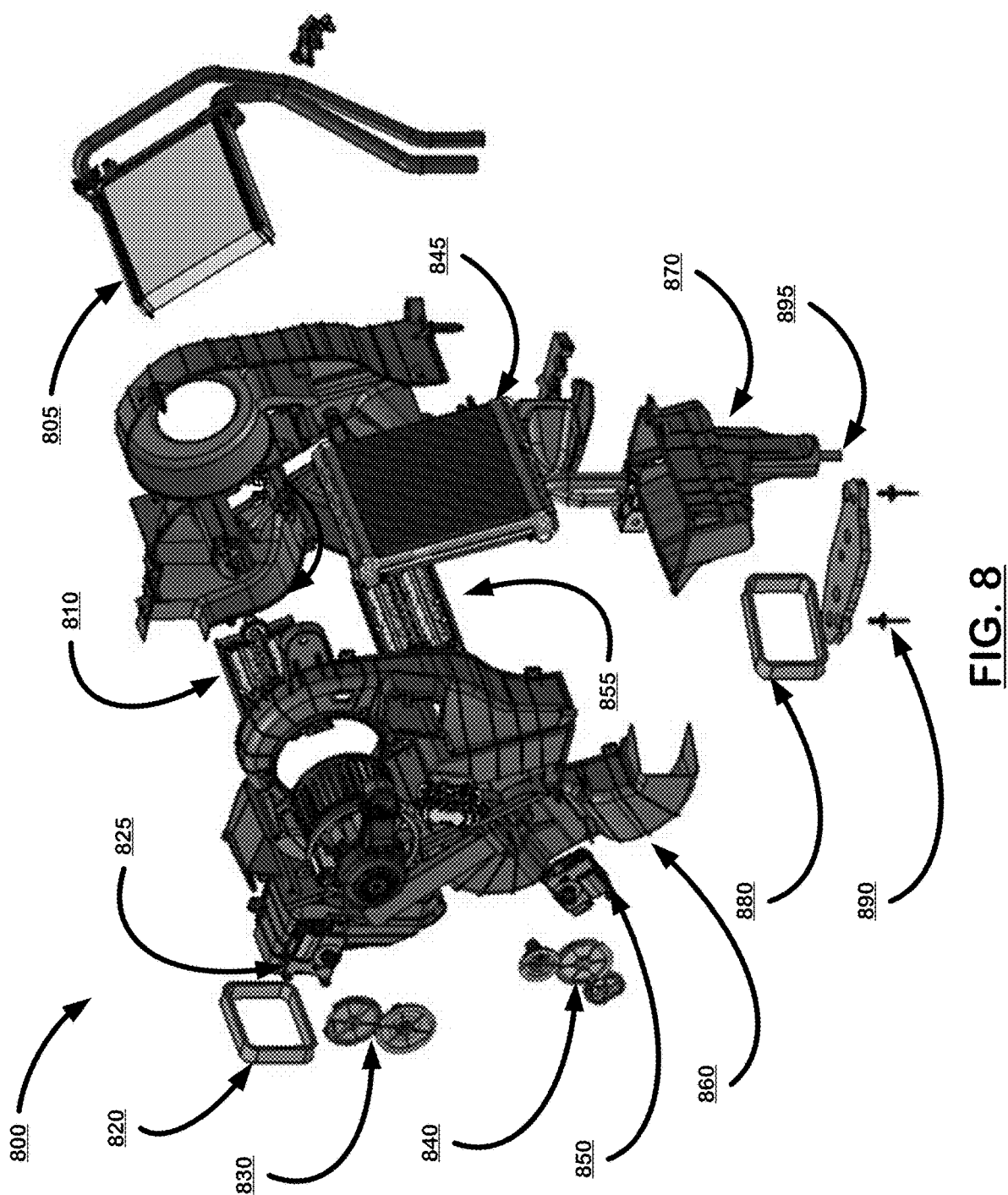
FIG. 8 shows an HVAC assembly in accordance with one or more embodiments.
Figure 9:
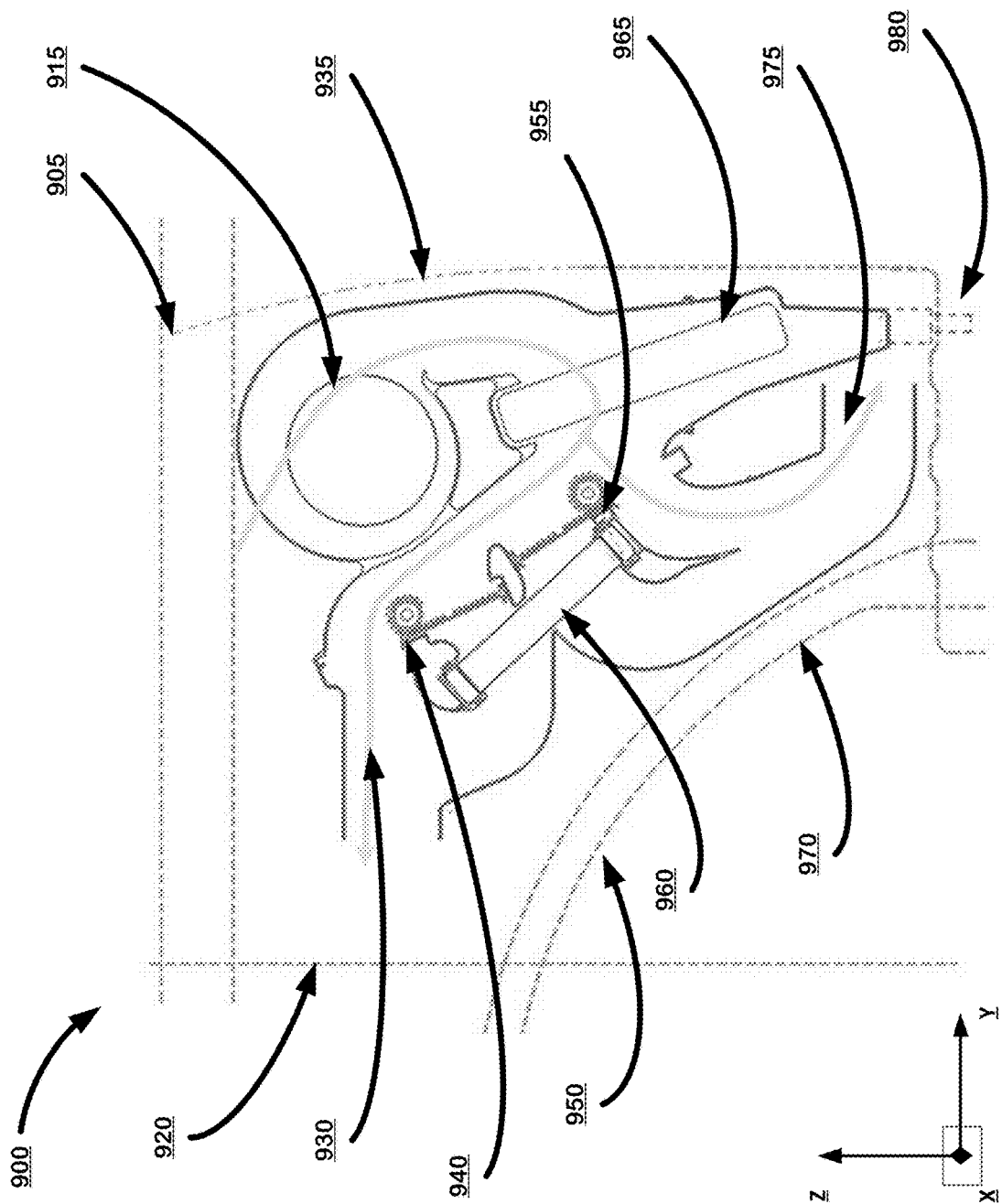
FIG. 9 shows an example of an HVAC assembly in accordance with one or more embodiments.
Figure 10:
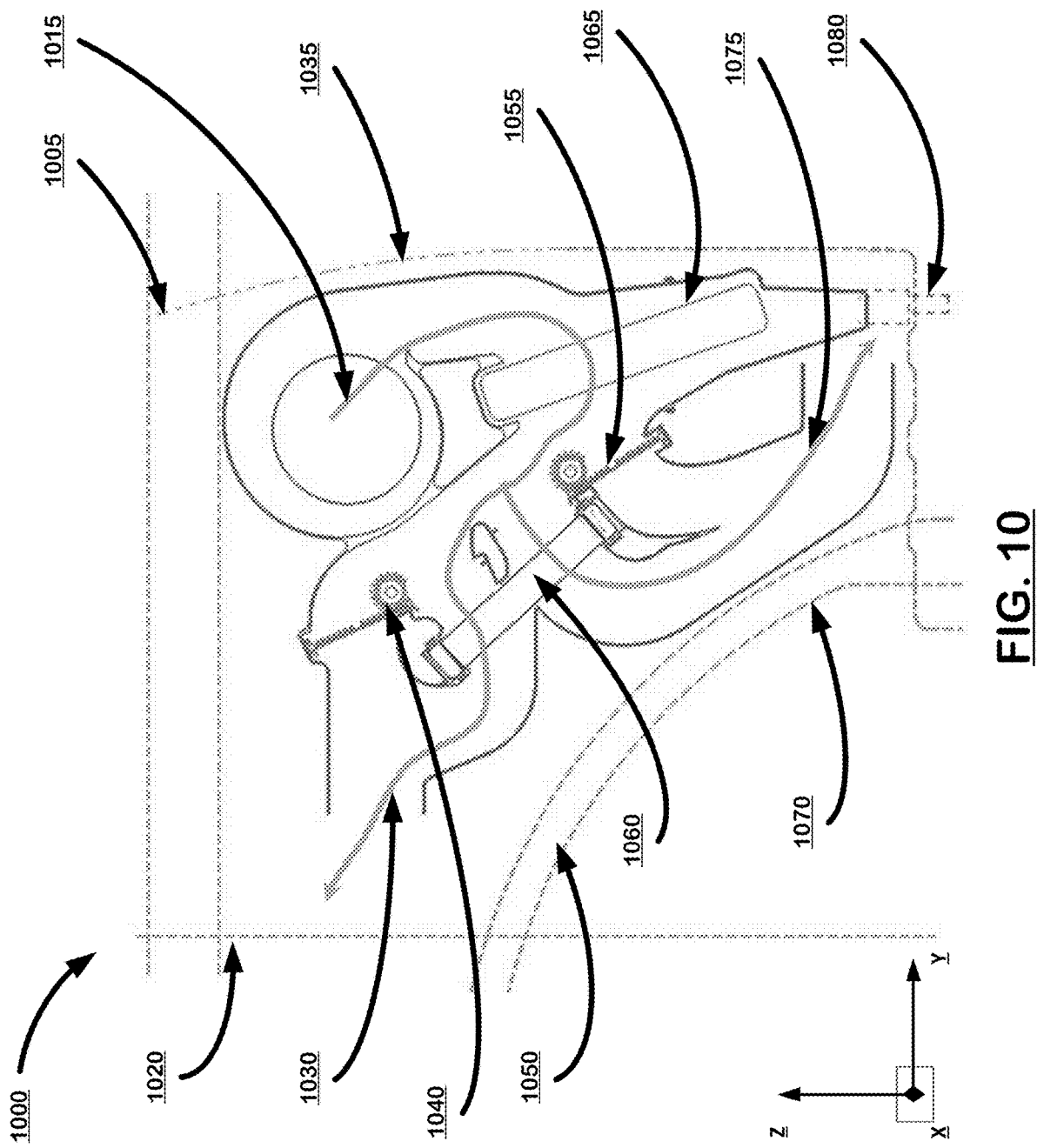
FIG. 10 shows an example of an HVAC assembly in accordance with one or more embodiments.

FIGS. 5-10 show cross-sectional views of an HVAC assembly in accordance with one or more embodiments. For example, FIGS. 5-10 may be close-up views and cross-sectional views of the HVAC assembly (300) described with respect to FIGS. 3A and 3B or cross-sectional views of the HVAC assembly (400) described with respect to FIGS. 4A and 4B. The cross-sectional views of FIGS. 9 and 10 are side views of an HVAC assembly from a direction along the X-axis. To this point, the dotted lines in FIGS. 9 and 10 represent the respective location of one or more of the obtaining, identifying and/or coordinating means described in FIGS. 3A-4B and positioned before or after a cross-sectional plane on the same direction.

Figure 5:
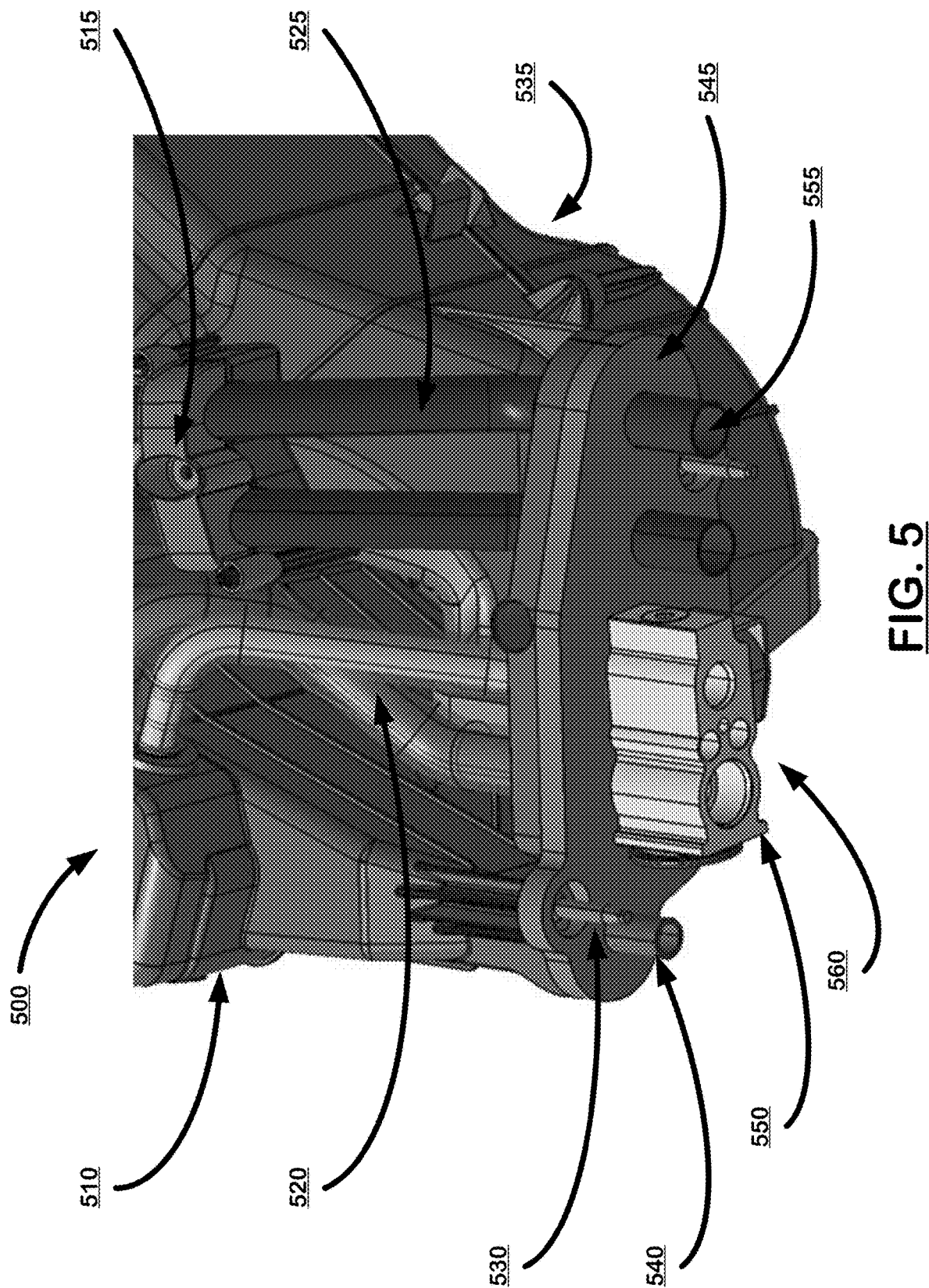
FIG. 5 shows a close-up view of an HVAC assembly in accordance with one or more embodiments.

Turning to FIG. 5, FIG. 5 shows a close-up of a HVAC assembly (500) that includes an area surrounding a support assembly (560) in which evaporator piping supply (520) is located between an evaporator (510) and a cooling piping supply (550). Further, the HVAC assembly (500) may include heater core piping (525) positioned between a heater core fastening (515) plugged to a heater core (not shown) and a heater core piping supply (555). The above elements may be covered and protected by assembly housings (535) configured for opening transversally with crevasses in a longitudinal direction. In one or more embodiments, the bottom of the HVAC assembly (500) includes a support assembly (560) configured to receive the evaporator piping supply (520) and the heater core piping supply (555).

In one or more embodiments, the HVAC assembly (500) may be configured to start at a sealed off, or closed, mode. In particular, the HVAC assembly (500) may be configured to revert to the closed mode upon powering down of the HVAC assembly (500). As such, the HVAC assembly (500) may remain in a closed mode for shipment or storage. In an event that the HVAC assembly (500) is assembled onto a motor vehicle, the motor vehicle may power down the HVAC assembly (500) at which point the upper blend kinematics and the lower blend kinematics may revert to the closed mode. Further, in one or more embodiments, the closed mode prevents any fresh air or recycled air from entering the air flow passageway and from reaching the heat exchanger and the assembly housings (535).

In one or more embodiments, the support assembly (560) includes at least one supply assembly stud (530) configured for engaging receiving and complementing orifices on a packing position. In this position, the supply assembly stud prevents the support assembly from shifting horizontally. As such, the support assembly may include various extrusions in which piping and engaging portions are disposed to serve the function of a connecting portion. As such, a sealing element (545) disposed on the support assembly may also include cutouts for allowing transverse access of the various piping and connection.

In addition, one or more embodiments, the support assembly (560) includes at least one release duct (540) through which excess mixed air may exit the assembly housings (535). Specifically, the release duct (540) may serve to release excess pressure in the assembly housings (535).

In one or more embodiments, the HVAC assembly (500) may be configured for allowing dynamic air flow to the various air flow outputs. For example, the HVAC assembly (500) may dynamically interpret one or more parameters associated to the inside of a passenger cabin or a driver cabin to determine that the HVAC assembly is to be configured into an open mode. The open mode may be a mode in which air is transporter from the air flow passageway. In an event when the passenger cabin is required to reach a temperature higher than a current temperature (e.g., to warm up a car), the kinematics of the various doors may be coordinated to allow flow of a hot air flow or a cold air flow as described above.

Turning to FIGS. 6A and 6B, FIGS. 6A and 6B show perspective views of an HVAC assembly in accordance with one or more embodiments. As shown in FIGS. 6A and 6B, the HVAC assemblies (600) may be a combination of various subassemblies assembled in a direction of insertion within a motor vehicle.

As shown in FIG. 6A, the HVAC assembly (600) may include a wheel blower (630) coupled through a blower air flow passageway to a fan motor resistor (640) and an evaporator (660). The HVAC assembly (600) may include upper blend kinematics (610) coupled through an upper air flow passageway to an upper air flow outlet (620). The HVAC assembly (600) may include a support assembly (680) disposed on a bottom of the HVAC assembly. The HVAC assembly (600) may include lower blend kinematics (670) coupled through an lower air flow passageway to a lower air flow outlet (690).

Further, as shown in FIG. 6B, the HVAC assembly cross-section (600) may include a perspective in which one half of the housing assemblies has been removed to look directly at some of the components in the HVAC assembly (600). Specifically, the heater core (655) and the evaporator (685) are shown as being configured for sliding into an assembled position before readying the HVAC assembly for operation. Further, the various blend kinematics are shown as including a sliding door as described with respect to FIGS. 3-5, which include a shaft for rotating and sliding an upper door (625) and a lower door (675) up and down.

Turning to FIG. 7, FIG. 7 shows an HVAC assembly packaging (700) may include at least one lateral limit (710) and an upper limit (715). Specifically, the HVAC assembly packaging (700) includes various packaging techniques for the HVAC assembly (740). For example, the HVAC assembly packaging (700) may include an upper radial limit (730) that approaches a heating core fastening flap (720) and a lower radial limit (750) that approaches a support assembly connecting surface (755). In one or more embodiments, the HVAC assembly packaging (700) may include at least one lateral limit (745) that is disposed adjacent to a rest of a packing area (735) unrelated to the packaging area of the HVAC assembly packaging (700).

In one or more embodiments, the lateral limit (710) may be a location at which a heating core fastening flap (720) is located in cross-section with an upper air flow outlet.

Similarly, another lateral flap may be a location at which a wheel blower fastening flap (725) is located in cross-section with an end of the HVAC assembly (740) in a horizontal direction.

In one or more embodiments, the HVAC assembly (740) may be packaged so that an upper radial limit (730) and a lower radial limit (750) are adjacent to the HVAC assembly (740). Further, in one or more embodiments, the HVAC assembly packaging (700) includes limits at a proximity allowing for minimal required distance from locations where a heater core and an evaporator are located.

In one or more embodiments, the HVAC assembly (740) may be a solely rear HVAC assembly that is disposed at the back of a motor vehicle. In one or more embodiments, the HVAC assembly packaging (700) fits behind the spare wheel in a motor vehicle. Further, the HVAC assembly packaging (700) may enable a good blend of air flow and temperature control to both sides of a motor vehicle. Specifically, a temperature balance may be achieved by regulating temperature levels at the location of temperature request.

Turning to FIG. 8, FIG. 8 shows a cross-section view of an assembly in accordance with one or more embodiments. For example, FIG. 8 may be a cross-section of the HVAC assembly (300) described with respect to FIGS. 3A and 3B, a cross-section of the HVAC assembly (400) described with respect to FIGS. 4A and 4B, a cross-section of the HVAC assembly (500) described with respect to FIG. 5, or a cross-section of the HVAC assembly (600) described with respect to FIGS. 6A and 6B. As shown in FIG. 8, an HVAC assembly (800) may include hardware and software for actuating two different air flows individually and simultaneously.

In one or more embodiments, the HVAC assembly (800) may include upper blend kinematics including an upper sensor arrangement (830), an upper actuator (825), and an upper door (810) that supplies an upper air flow outlet (820). Further, the HVAC assembly (800) may include lower blend kinematics including a lower sensor arrangement (840), a lower actuator (850), and a lower door (855) that supplies a lower air flow outlet (880).

In one or more embodiments, a release duct (895) may be disposed at a bottom portion of the HVAC assembly (800) through a bottom surface connected through one or more support assembly studs (890). Similarly, heater core piping (805) and evaporator piping (845) may be disposed through the support surface to improve packaging, as described with respect to the HVAC assembly packaging (700) of FIG. 7.

Turning to FIG. 9, FIG. 9 shows a cross-section view of an assembly in accordance with one or more embodiments. For example, FIG. 9 may be a cross-section of the HVAC assembly (300) described with respect to FIGS. 3A and 3B, a cross-section of the HVAC assembly (400 described with respect to FIGS. 4A and 4B, a cross-section of the HVAC assembly (500) described with respect to FIG. 5, or a cross-section of the HVAC assembly (600) described with respect to FIGS. 6A and 6B. As shown in FIG. 9, an HVAC assembly (900) may include hardware and software for actuating two different air flows individually and simultaneously.

As shown in FIG. 9, an HVAC assembly (900) may include an upper door (940) before an upper airflow outlet. Further, the HVAC assembly (700) may include a heater core (960). Similarly, the HVAC assembly (900) may include a lower door (955) positioned below the upper door (940) in a direction along a Z-axis. In one or more embodiments, the upper door (940 and the lower door (955) are disposed after an air flow passageway for controlling air flow to a mixed air pocket and a release duct (980) and after an evaporator (965) and a wheel motor (915).

In one or more embodiments, the HVAC assembly (900) may be configured to slide the upper door (940) to a fully open position after a temperature command indicates a target pressure at a location outside the HVAC assembly (900). In particular, the HVAC assembly (900) may be configured to open or close the upper door (940) independent from any movement of the lower door (955). As such, the HVAC assembly (900) may remain in a constant mode after the blend kinematics are coordinated as described with respect to FIGS. 3A-8. FIG. 9 references an example in which the cabin location associated with the upper door (940) is maintained cooled after the coordinating. A reverse process, or a combination of both, may be applied for maintaining the vehicle/passenger cabin warm after the coordinating.

In one or more embodiments, the HVAC assembly (900) may be configured to slide the lower door (955) to a fully open position after a temperature command indicates a target pressure at a location outside the HVAC assembly (900). In particular, the HVAC assembly (900) may be configured to open or close the lower door (955) independent from any movement of the upper door (940). As such, the HVAC assembly (900) may remain in a constant mode after the blend kinematics are coordinated as described with respect to FIGS. 3A-8. FIG. 9 references an example in which the cabin location associated with the lower door (955) is maintained cooled after the coordinating. A reverse process, or a combination of both, may be applied for maintaining the cabin warm after the coordinating.

In one or more embodiments, the HVAC assembly (900) may be configured for allowing dynamic air flow to the various doors. For example, the HVAC assembly (900) may dynamically interpret one or more parameters associated to the inside of various locations in a passenger cabin to determine that the HVAC assembly is to be configured into a mixed mode. The open mode may be a mode in which air is fully transporter from the middle air flow passageway after the evaporator (965) flushes air flow without going through the heater core (960). In an event when the passenger cabin is required to reach a temperature lower than a current temperature (e.g., to cool down a car), the kinematics of the various doors may be coordinated to allow flow of a cold air flows (930) and (975) before allowing flow of a hot air flow (not shown). To this point, a door may be actuated at different velocities with respect to another to allow only one cold air flow through.

In one or more embodiments, the HVAC assembly (900) is disposed within a packaging limited by lateral limits (905), (920), and (935). These lateral limits may be determined based on door area restrictions of the back of a motor vehicle. The packaging of the HVAC assembly (900) may also be limited by radial limits (950) and (970). These radial limits may be determined based on wheel area restrictions in a motor vehicle in a rotational direction clockwise and around the X-axis.

Turning to FIG. 10, FIG. 10 shows a cross-section view of an assembly in accordance with one or more embodiments. For example, FIG. 10 may be a cross-section of the HVAC assembly (300) described with respect to FIGS. 3A and 3B, a cross-section of the HVAC assembly (400) described with respect to FIGS. 4A and 4B, a cross-section of the HVAC assembly (500) described with respect to FIG. 5, or a cross-section of the HVAC assembly (600) described with respect to FIGS. 6A and 6B. As shown in FIG. 10, an HVAC assembly (1000) may include hardware and software for actuating two different air flows individually and simultaneously.

As shown in FIG. 10, an HVAC assembly (1000) may include an upper door (1040) before an upper air flow outlet. Further, the HVAC assembly (1000) may include a heater core (1060). Similarly, the HVAC assembly (1000) may include a lower door (1055) positioned below the upper door (1040) in a direction along a Z-axis. In one or more embodiments, the upper door (1040) and the lower door (1055) are disposed after an air flow passageway for controlling air flow to a mixed air pocket and a release duct (1080) and after an evaporator (1065) and a wheel motor (1015).

In one or more embodiments, the HVAC assembly (1000) may be configured to slide the upper door (1040) to a fully open position after a temperature command indicates a target pressure at a location outside the HVAC assembly (1000). In particular, the HVAC assembly (1000) may be configured to open or close the upper door (1040) independent from any movement of the lower door (1055). As such, the HVAC assembly (1000) may remain in a constant mode after the blend kinematics are coordinated as described with respect to FIGS. 3A-8. FIG. 10 references an example in which the cabin location associated with the upper door (1040) is maintained cooled after the coordinating. A reverse process, or a combination of both, may be applied for maintaining the cabin warm after the coordinating.

In one or more embodiments, the HVAC assembly (1000) may be configured to slide the lower door (1055) to a fully closed position after a temperature command indicates a target pressure at a location outside the HVAC assembly (1000). In particular, the HVAC assembly (1000) may be configured to open or close the lower door (1055) independent from any movement of the upper door (1040). As such, the HVAC assembly (1000) may remain in a constant mode after the blend kinematics are coordinated as described with respect to FIGS. 3A-8. FIG. 9 references an example in which the cabin location associated with the lower door (1055) is maintained cooled after the coordinating. A reverse process, or a combination of both, may be applied for maintaining the cabin warm after the coordinating.

In one or more embodiments, the HVAC assembly (1000) may be configured for allowing dynamic air flow to the various doors. For example, the HVAC assembly (1000) may dynamically interpret one or more parameters associated to the inside of various locations in a passenger cabin to determine that the HVAC assembly is to be configured into a mixed mode. The open mode may be a mode in which air is fully transporter from the middle air flow passageway after the evaporator (1065) flushes air flow without going through the heater core (10960). In an event when the passenger cabin is required to reach a temperature lower than a current temperature (e.g., to cool down a car), the kinematics of the various doors may be coordinated to allow flow of a hot air flows (1030) and (1075) before allowing flow of a cold air flow (not shown). To this point, a door may be actuated at different velocities with respect to another to allow only one cold air flow through.

In one or more embodiments, the HVAC assembly (1000) is disposed within a packaging limited by lateral limits (1005), (1020), and (1035). These lateral limits may be determined based on door area restrictions of the back of a motor vehicle. The packaging of the HVAC assembly (1000) may be limited by radial limits (1050) and (1070). These radial limits may be determined based on wheel area restrictions in a motor vehicle in a rotational direction clockwise and around the X-axis.

Figure 11:
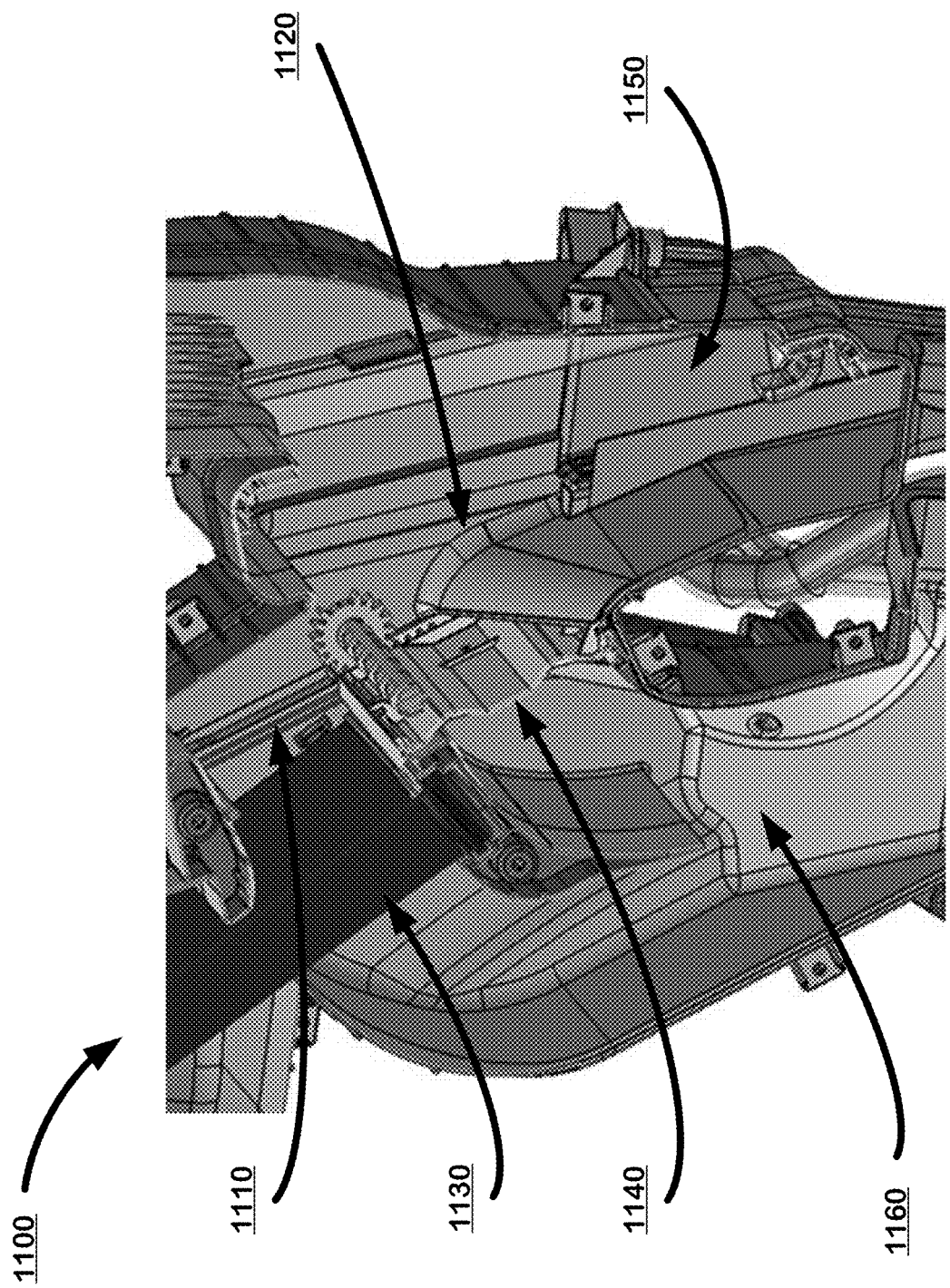
FIG. 11 shows a close-up view of an HVAC assembly in accordance with one or more embodiments.

Turning to FIG. 11, FIG. 11 shows a cross-section view of an HVAC assembly in accordance with one or more embodiments. For example, FIG. 11 may be a cross-section of the HVAC assemblies described with respect to FIGS. 3A-10. As shown in FIG. 11, an HVAC assembly (1100) may include lower blend kinematics including a lower door (1140) on a set of opening rails (1110). The HVAC assembly (1110) may include a substantially curved portion (1120) that follows a radial shape between an evaporator (1150), the lower blend kinematics, and a lower air flow passageway. In one or more embodiments, the lower door (1140) is disposed before the lower air flow passageway (1160) for controlling air flow into a mixed air pocket or a mixed air chamber.

In one or more embodiments, the substantially curved portion (1120) may be configured to ramp up air flow speed and movement inside the assembly housings by thrusting air flow from the evaporator (1150) and into to lower air flow passageway (1160). The air flow may follow the substantially curved portion (1120) at any of the positons of the lower door (1140).

Specifically, as shown in FIGS. 9-11, an HVAC assembly may include various air flows traveling at different velocities inside of the HVAC assemblies. For example, in a case when the HVAC assembly is selected to output two separate and distinct cold air flows, a wheel blower may push air through a fan motor resistor. At this point, velocity of the air flow may be reduced by an evaporator, which slows down the air flow for the air to freely move based on the individual actuation of the doors. For example, air flows through an area towards an outside of an upper door and a lower door may be controlled independently to allow air passage at different pressures simultaneously. In this case, one door for an air flow corresponding to one zone will move to limit air flow through one airflow channel and allow air through the other. For example, in an event when a user controlling the lower blend kinematics wants to have warmer air, the bottom door will more downwards to push air flow through the heater core instead of going directly between the evaporator to the corresponding airflow channel. Specifically, air flow velocity may be controlled by corresponding blend kinematics of an upper air flow passageway and a lower air flow passageway.

In one or more embodiments, the HVAC assembly may be configured to release built up mixed air through a release duct located at a position of release in the HVAC assemblies. In particular, the HVAC assembly may be configured to open the release duct automatically upon detecting air velocity or a drag coefficient above a predetermined threshold inside the HVAC assembly. As such, the HVAC assembly may remain in a constant mode after the blend kinematics are coordinated as described with respect to FIGS. 3A-11.

Turning to FIG. 12, FIG. 12 shows a flowchart in accordance with one or more embodiments. Specifically, FIG. 12 describes a method (1200) for supplying different mixed air flows simultaneously in an HVAC assembly of a motor vehicle. One or more blocks in FIG. 1 or 2 may be performed by one or more components as described above in FIGS. 3-11. While the various blocks in FIG. 12 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1210, a temperature command is obtained in accordance with one or more embodiments. The temperature command is based on a rule indicating a target temperature of a passenger cabin, a current temperature of the passenger cabin, an outside temperature, and/or a function representative of the target temperature of the passenger cabin, the current temperature of the passenger cabin, and the outside temperature. For example, a sensor arranged with an internal link cam collect signals associated to one or more doors allowing passage of air flows. As such, the sensor configured for obtaining one or more of the various temperature values may receive constant feedback from one or more sensors associated to the various doors.

In Block 1220, a pattern of blend kinematics for mixing two or more air flows are identified in accordance with one or more embodiments. The pattern may be determined upon processing of the obtained values. For example, the values obtained in Block 1210 may be translated based upon their physical relations with velocity, volume, and temperature. As such, the pattern may be generated calculating the opening of the various doors independent to one another as a function of time.

In one or more embodiments, the pattern of blend kinematics identified may include pattern requirements for two distinct air flows to be delivered to two different locations outside the HVAC assembly.

In Block 1230, the blend kinematics may be coordinated in accordance with one or more embodiments. The blend kinematics are coordinated between the various doors regulating a corresponding hot air flow and a corresponding cold air flow. To this point, the blend kinematics include independent patterns that determines a difference in actuation between the first door and the second door. As commands arrive to the HVAC assembly, the HVAC assembly evaluates instructions of required functions, such as supplying a specific temperature or pressure to a passenger cabin. In particular, the HVAC assembly may receive a command for attaining a required temperature. In response, the HVAC assembly may evaluate the pressure, temperature, and velocity of air flow. As such, the HVAC assembly may determine that a specific combination of blend kinematics following the identified pattern for each location inside the passenger's cabin. In one or more embodiments, a passenger's cabin is any area inside the motor vehicle, even including the area surrounding the driver's seat.

In one or more embodiments, each patter followed by each door kinematic includes regulating both a hot air flow and a cold air flow simultaneously as closing access to hot air includes proportionally denying access to cold air and vice-versa. As such, the HVAC assembly must determine patterns that allow for the most efficient air flow exchange upon receiving the temperature command.

In Block 1240, the corresponding hot air flow and the corresponding cold air flow are mixed and the blend kinematics are dynamically modified for each door simultaneously based on immediate changes to the temperature command and the rule. The passenger cabin may be monitored to obtain several parameters associated with it. In particular, information and parameters relating to an inside temperature, pressure, or humidity level may be obtained through one or more sensing devices. For example, the sensing devices may be hardware or software configured to sample physical phenomena. This step may include, for example, automatically adapting the degree of aperture of each of the various doors to accommodate an optimum configuration for the doors to meet a user demand. Alternatively, this step may include, for example, automatically adapting the degree of aperture of each of the various doors to accommodate an optimum configuration for the doors to meet a minimum energy usage.

In one or more embodiments, "automatically" refers to dynamically adapting the openings of the doors without a user's interference in accordance with one or more embodiments. Further, in one or more embodiments, "dynamically adapting" is performed without the use of electronics and is automatically determined upon perception of mechanical flaps actively shifting degrees of apertures for each of the doors.

In one or more embodiments, the same configurations and in opposite behavior are applied to the various doors. As such, inverse configurations to those shown in FIGS. 1-11 may be configured for the HVAC assembly.

Figure 13:
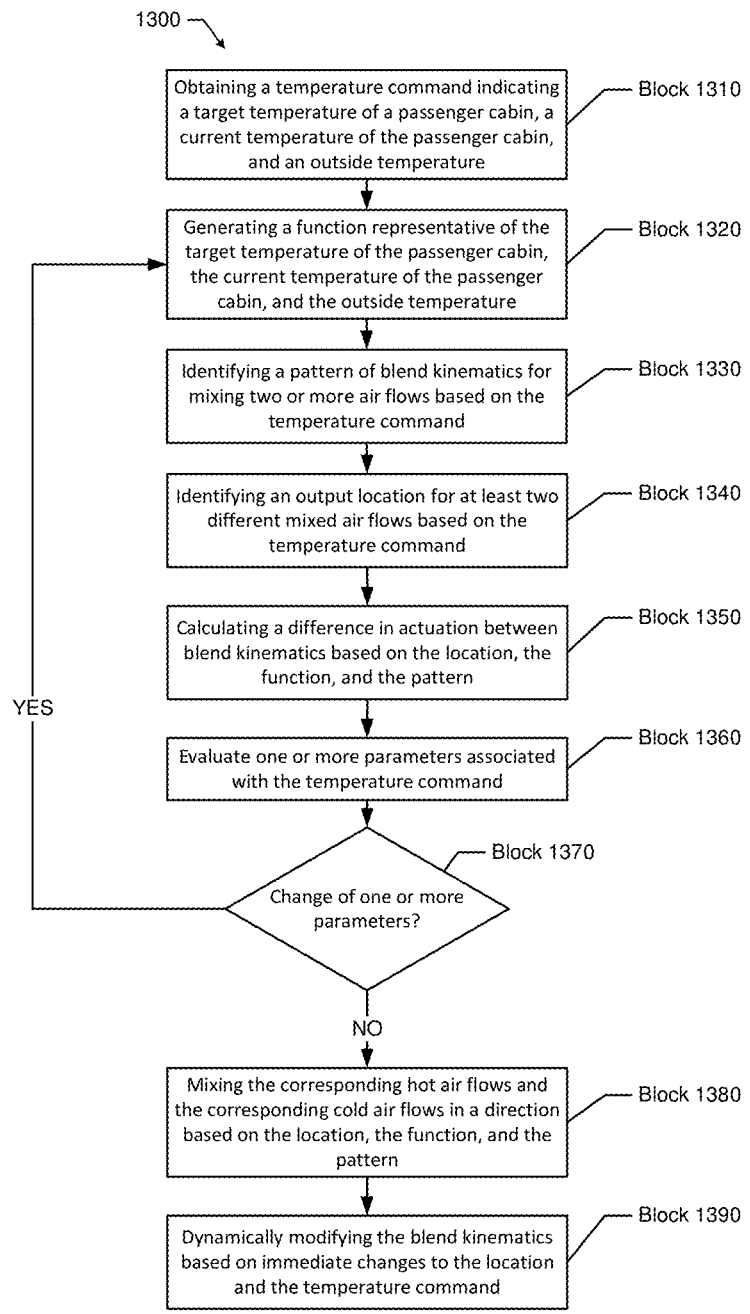
FIG. 13 shows a flowchart describing a process for supplying different mixed air flows to corresponding locations inside a motor vehicle in accordance with one or more embodiments.

Turning to FIG. 13, FIG. 13 shows a flowchart in accordance with one or more embodiments. Specifically, FIG. 13 describes a method (1300) for managing blend kinematics in an HVAC assembly of a motor vehicle. One or more blocks in FIG. 1 or 2 may be performed by one or more components as described above in FIGS. 3-11. While the various blocks in FIG. 13 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1310, a temperature command is obtained based on a rule indicating a target temperature of a passenger cabin, a current temperature of the passenger cabin, and an outside temperature. For example, the various obtaining means discussed in reference to FIGS. 1-11 may be arranged to obtain one or more temperature values. As described above, by definition, temperature samples associated to air flow may provide volume and pressure information.

In Block 1320, a function is generated representative of the target temperature of the passenger cabin, the current temperature of the passenger cabin, and the outside temperature in accordance with one or more embodiments. For example, a target temperature may be requested or selected in a passenger cabin. In one or more embodiments, this required temperature or pressure may be treated as the target temperature to be achieved over a period of time.

In Block 1330, a pattern of blend kinematics is identified for mixing two or more air flows based on the temperature command. For example, the pattern may include coordinated aperture values for each of the various doors. In particular, the doors may be implemented at different degrees of aperture for performing adaptive behavior automatically in response to changes inside the passenger cabin. As such, each door may manipulate two air flows because a door restricts one type of air flow while increasing another type. Thus, if two doors are used, at least four air flows are mixed.

In Block 1340, a location for at least two different mixed air flows is identified based on the temperature command. Specifically, the temperature command may include values representative of at least two locations from which two different mixed air flows are requested simultaneously. As such, the temperature command may be updated in real time and the locations requesting changes to the temperature command may be included for supplying corresponding air flows to their respective locations.

In Block 1350, a difference in actuation between the doors may be calculated based on the location, the function, and the pattern. In one or more embodiments, blend kinematics are coordinated between at least a first air inlet and a second air inlet following the pattern identified in accordance with one or more embodiments. In particular, the various doors are actuated at a same or different times and the various doors rotate consistent with the pattern. The HVAC assembly determines a difference in actuation between the doors based on the function and the pattern. As such, the changes to the doors implemented simultaneously and upon calculation.

In one or more embodiments, the doors are part of a corresponding blend kinematics as described with respect to FIGS. 3-11. Specifically, blocks described above may be implemented to the entire blend kinematics.

In Block 1360, one or more parameters associated with an inside of a passenger cabin of the motor vehicle are evaluated. For example, the inside of the passenger cabin is sampled for one or more parameters and these parameters are evaluated to determine triggers for changing a required mixed air pressures for each of the identified locations.

In one or more embodiments, the one or more parameters are selected from a group consisting of: a humidity level, a difference in temperature with an outside of the passenger cabin, a pressure on an air intake door, and a primary door. As such, by modifying the temperature in the manner discussed above, for example, a temperature balance may be achieved in a passenger cabin.

In Block 1370, a determination is made as to whether a change of one or more of the parameters has occurred in accordance with one or more embodiments. Specifically, a decision is made to determine whether one or more parameters have been modified. If it is determined that the one or more parameters were not changed, the method proceeds to Block 1480 to determine a compensation air pressure associated with the required mixed air pressure. For example, a level of humidity may remain the same inside the passenger cabin and the required mixed air pressure stays the same allowing further actuation in the HVAC assembly. In particular, the HVAC assembly may proceed to reach the previously identified required mixed air pressure. Alternatively, if one or more parameters are determined to have changed, the method moves to Block 1320 to identify a new required mixed air pressure. For example, if the humidity in the passenger cabin where to change, a new mixed air pressure may be required in the HVAC assembly to reach a required temperature value.

In Block 1380, the corresponding hot air flow and the corresponding cold air flow for each of the blend kinematics are mixed in accordance with one or more embodiments. In such an event, a difference between a current temperature and the target temperature is determined. As such, a decision is made to reach the target temperature by any of the modes discussed above.

In Block 1390, the blend kinematics are dynamically modified based on immediate changes to the temperature command and the rule. The target air temperature is maintained irrespective of changes in the one or more parameters. Similarly, the HVAC assembly may be configured to determine new compensation pressure values to maintain a constant temperature inside the passenger cabin.

In one or more embodiments, the same configurations and in opposite behavior are applied to the various doors. As such, inverse configurations to those shown in FIGS. 1-13 may be configured for the HVAC assembly.

Embodiments disclosed herein are directed to an HVAC architecture that allows left and right temperature balance in a passenger cabin of a motor vehicle, with a design including upper and lower blend chambers. This design is advantageous for compactness and packaging layout. Embodiments disclosed herein use stacked sliding doors to allow for a slender/compact architecture.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A heating, ventilation, and air-conditioning (HVAC) assembly for supplying different mixed air flows simultaneously, the assembly comprising:
   first blend kinematics configured for allowing passage of a first air flow;
   second blend kinematics configured for allowing passage of a second air flow;
   a heater core configured to exchange heat with the first air flow and the second air flow;
   obtaining means configured to obtain a temperature command indicating a target temperature for two different locations outside the HVAC assembly;
   identifying means configured to identify a pattern for the first blend kinematics and the second blend kinematics for modifying the first air flow and the second air flow based on the temperature command, each air flow regulating a corresponding hot air flow and a corresponding cold air flow; and
   coordinating means configured to coordinate each of the first blend kinematics and the second blend kinematics simultaneously,
   wherein the identifying means and the coordinating means dynamically modify each of the first and second blend kinematics individually based on immediate changes to the temperature command, and
   wherein the first blend kinematics and the second blend kinematics supply air flow through the heater core.

2. The assembly of claim 1,
   wherein the obtaining means and the identifying means evaluate one or more parameters associated with the temperature command, and
   wherein the obtaining means obtain at least one result from the evaluated one or more parameters.

3. The assembly of claim 2,
   wherein the obtaining means and the identifying means determine the immediate changes to the temperature command and a rule based on the at least one result, and
   wherein the obtaining means and the identifying means update the first blend kinematics or the second blend kinematics based on the immediate changes to the temperature command and the rule.

4. The assembly of claim 1, the assembly further comprising:
   a support assembly and fastening flaps configured for allowing connection of the HVAC assembly into a packaging space,
   wherein the packaging space is in between two walls of a motor vehicle or adjacent to an area of the motor vehicle comprising a housing for a wheel.

5. The assembly of claim 4,
   wherein the first blend kinematics and the second blend kinematics each comprise a sensor arrangement, an actuator, and a door,
   wherein each door proportionally slides to open or close air flow to different air flow passageways such that each door opens a first air flow passageway while closing a second air flow passageway.

6. The assembly of claim 4,
wherein the obtaining means comprise an Engine Control Unit (ECU) of the motor vehicle coupled to an internal link cam,
wherein the identifying means comprise a processor coupled to the internal link cam, and
wherein the coordinating means comprise a plurality of links and levers interconnected with the first blend kinematics and the second blend kinematics.

7. The assembly of claim 1, wherein the first blend kinematics and the second blend kinematics are configured to dynamically move from a closed position to an open position.

8. The assembly of claim 7, wherein the first blend kinematics and the second blend kinematics are moved by different actuators actuated independently from one another.

9. A method for supplying different mixed air flows simultaneously in a heating, ventilation, and air-conditioning (HVAC) assembly for a motor vehicle, the method comprising:
obtaining a temperature command indicating a target temperature for two different locations outside the HVAC assembly;
identifying a pattern for first blend kinematics and second blend kinematics for modifying a first air flow and a second air flow based on the temperature command, each air flow regulating a corresponding hot air flow and a corresponding cold air flow;
coordinating each of the first blend kinematics and the second blend kinematics simultaneously;
dynamically modifying each of the blend kinematics individually based on immediate changes to the temperature command, and
supplying air flow from the first blend kinematics and the second blend kinematics through a heater core.

10. The method of claim 9, the method further comprising:
evaluating one or more parameters associated with the temperature command, and
obtaining at least one result from the evaluated one or more parameters.

11. The method of claim 10, the method further comprising:
determining the immediate changes to the temperature command and a rule based on the at least one result; and
updating the first blend kinematics or the second blend kinematics based on the immediate changes to the temperature command and the rule.

12. The method of claim 9, wherein the first blend kinematics and the second blend kinematics are configured to dynamically move from a closed position to an open position.

13. The method of claim 12, wherein the first blend kinematics and the second blend kinematics are moved by different actuators actuated independently from one another.

14. The method of claim 9,
wherein the first blend kinematics and the second blend kinematics each comprise a sensor arrangement, an actuator, and a door,
wherein each door proportionally opens or closes air flow to different air flow passageways such that each door opens a first air flow passageway while closing a second air flow passageway.

15. A heating, ventilation, and air-conditioning (HVAC) assembly for supplying different mixed air flows simultaneously, the assembly comprising:
first blend kinematics configured for allowing passage of a first air flow;
second blend kinematics configured for allowing passage of a second air flow;
a heater core configured to exchange heat with the first air flow and the second air flow;
obtaining means configured to obtain a temperature command indicating a target temperature for two different locations outside the HVAC assembly;
identifying means configured to identify a pattern for the first blend kinematics and the second blend kinematics for modifying the first air flow and the second air flow based on the temperature command, each air flow regulating a corresponding hot air flow and a corresponding cold air flow;
coordinating means configured to coordinate each of the first blend kinematics and the second blend kinematics simultaneously; and
a support assembly and fastening flaps configured for allowing connection of the HVAC assembly into a packaging space,
wherein the identifying means and the coordinating means dynamically modify each of the blend kinematics individually based on immediate changes to the temperature command, and
wherein the first blend kinematics and the second blend kinematics supply air flow through the heater core.

16. The assembly of claim 15, wherein the packaging space is in between two walls of a motor vehicle or adjacent to an area of the motor vehicle comprising a housing for a wheel.

17. The assembly of claim 16,
wherein the obtaining means and the identifying means determine the immediate changes to the temperature command and a rule based on at least one result, and
wherein the obtaining means and the identifying means update the first blend kinematics or the second blend kinematics based on the immediate changes to the temperature command and the rule.

18. The assembly of claim 15,
wherein the obtaining means and the identifying means evaluate one or more parameters associated with the temperature command, and
wherein the obtaining means obtain at least one result from the evaluated one or more parameters.

19. The assembly of claim 15, wherein the first blend kinematics and the second blend kinematics are configured to dynamically move from a closed position to an open position.

20. The assembly of claim 15, wherein the first blend kinematics and the second blend kinematics are moved by different actuators actuated independently from one another.

* * * * *